United States Patent
Lee et al.

(10) Patent No.: US 10,802,578 B2
(45) Date of Patent: Oct. 13, 2020

(54) METHOD FOR DISPLAYING IMAGE, STORAGE MEDIUM, AND ELECTRONIC DEVICE

(71) Applicant: Samsung Electronics Co., Ltd., Suwon-si, Gyeonggi-do (KR)

(72) Inventors: Sun-Kee Lee, Seongnam-si (KR); Gong-Bo Moon, Suwon-si (KR); Kyung-Tae Kim, Hwaseong-si (KR); Yo-Han Lee, Seongnam-si (KR); A-Ran Cha, Goyang-si (KR); Eun-Jung Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 15/845,378

(22) Filed: Dec. 18, 2017

(65) Prior Publication Data

US 2018/0181196 A1    Jun. 28, 2018

(30) Foreign Application Priority Data

Dec. 22, 2016  (KR) .................. 10-2016-0177058

(51) Int. Cl.
    *G06F 3/01*    (2006.01)
    *G02B 27/01*   (2006.01)
    *G06T 7/70*    (2017.01)
    *H04N 5/232*   (2006.01)
    (Continued)

(52) U.S. Cl.
    CPC ......... *G06F 3/012* (2013.01); *G02B 27/0172* (2013.01); *G06F 3/011* (2013.01); *G06F 3/017* (2013.01); *G06T 7/246* (2017.01); *G06T 7/70* (2017.01); *H04N 5/225251* (2018.08); *H04N 5/23238* (2013.01); *H04N 5/23267* (2013.01); *H04N 5/23293* (2013.01); *H04N 5/23296* (2013.01); *G02B 2027/014* (2013.01); *G02B 2027/0138* (2013.01); *G06T 2207/10016* (2013.01); *G06T 2207/30221* (2013.01); *G06T 2207/30244* (2013.01)

(58) Field of Classification Search
    CPC ........... G06F 3/012; G06T 7/246; G06T 7/70; H04N 5/225251; G02B 27/0172
    See application file for complete search history.

(56) References Cited

U.S. PATENT DOCUMENTS

| | | |
|---|---|---|
| 7,747,105 B2 | 6/2010 | Koch |
| 2007/0003108 A1 | 1/2007 | Chinomi et al. |
| | (Continued) | |

FOREIGN PATENT DOCUMENTS

| | | |
|---|---|---|
| JP | 2006-321419 A | 11/2006 |
| KR | 10-2012-0105201 A | 9/2012 |
| | (Continued) | |

*Primary Examiner* — Sejoon Ahn
(74) *Attorney, Agent, or Firm* — Jefferson IP Law, LLP

(57) ABSTRACT

An electronic device is provided. The electronic device includes a display, and a processor functionally connected to the display and configured to, when a first input is received while a first partial image, which corresponds to a first direction, in an image taken by at least one camera is displayed on the display, control the display to display a second partial image, which corresponds to a second direction different from the first direction, in the image in response to the first input.

16 Claims, 30 Drawing Sheets

(51) Int. Cl.
    *H04N 5/225*     (2006.01)
    *G06T 7/246*     (2017.01)

(56) References Cited

U.S. PATENT DOCUMENTS

| | | | | |
|---|---|---|---|---|
| 2008/0074489 | A1* | 3/2008 | Zhang | G06T 3/4038 |
| | | | | 348/36 |
| 2009/0128565 | A1* | 5/2009 | Wong | G06T 19/00 |
| | | | | 345/428 |
| 2009/0160996 | A1* | 6/2009 | Yamaoka | G06T 5/006 |
| | | | | 348/333.11 |
| 2010/0066676 | A1* | 3/2010 | Kramer | G06K 9/00375 |
| | | | | 345/158 |
| 2010/0123737 | A1* | 5/2010 | Williamson | G06T 13/80 |
| | | | | 345/672 |
| 2010/0131549 | A1* | 5/2010 | Kramer | G06F 16/00 |
| | | | | 707/769 |
| 2010/0131880 | A1* | 5/2010 | Lee | H04M 1/72547 |
| | | | | 715/769 |
| 2012/0096132 | A1* | 4/2012 | Lim | H04L 12/66 |
| | | | | 709/220 |
| 2013/0247114 | A1* | 9/2013 | Kobayashi | H04N 21/42222 |
| | | | | 725/62 |
| 2013/0326419 | A1* | 12/2013 | Harada | G06F 3/04817 |
| | | | | 715/838 |
| 2015/0029379 | A1 | 1/2015 | Kim et al. | |
| 2015/0317829 | A1* | 11/2015 | Carter | G06T 19/006 |
| | | | | 345/633 |
| 2016/0373828 | A1* | 12/2016 | Seol | H04N 21/8153 |
| 2017/0195615 | A1* | 7/2017 | Han | G06F 3/04883 |

FOREIGN PATENT DOCUMENTS

| | | |
|---|---|---|
| KR | 10-2013-0115952 A | 10/2013 |
| KR | 10-2015-0012742 A | 2/2015 |
| KR | 10-2015-0025268 A | 3/2015 |

\* cited by examiner

METHOD FOR DISPLAYING IMAGE, STORAGE MEDIUM, AND ELECTRONIC DEVICE

CROSS-REFERENCE TO RELATED APPLICATION(S)

This application claims the benefit under 35 U.S.C. § 119(a) from Korean patent application filed on Dec. 22, 2016 in the Korean Intellectual Property Office and assigned Serial number 10-2016-0177058, the entire disclosure of which is hereby incorporated by reference.

TECHNICAL FIELD

The present disclosure relates to an electronic device that displays an image and a method for displaying an image.

BACKGROUND

Wearable device are electronic devices that are provided in a form that can be worn on the body. Wearable devices include head-mounted electronic devices, such as a head-mounted display (HID) device.

An HMD device may be worn on a user's body part of a user (e.g., a user's head) and may provide the user with a virtual-reality (VR) environment. Providing a VR environment may include, for example, displaying a screen for realizing virtual reality and providing various user interfaces for realizing virtual reality.

A HMD device may sense acceleration, angular speed or a direction of inclination and may display a screen corresponding to the sensed information. Accordingly, the HID device may display a screen that changes corresponding to a user's movement, and the user may be provided with realistic services by watching the changing screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a head-mounted display (HMD) device that renders an updated image by reflecting the movement of a user detected through head tracking technology. For example, the HMD device may provide realistic image service by being worn on the user's face and functioning in a manner that reflects the movement of the user. However, since a large quantity of resources is required in order to process substantial data related to the conversion or calibration of a high-quality or high-capacity image, when a delay in updating an image occurs as the viewing direction (i.e., gaze) of the user is changed, motion sickness may arise from a sensory mismatch. Moreover, since the viewing direction of the user is determined based on the current gaze direction of the HMD device, there is a limit in the extent to which a realistic image service reflecting various viewpoints of the user can be provided.

Thus, there are needed methods for updating an image based on various viewpoints according to a view mode selected by the user.

In accordance with an aspect of the present disclosure, an electronic device is provided. The electronic device includes a display, and a processor functionally connected to the display and configured to, when a first input is received while a first partial image, which corresponds to a first direction, in an image taken by at least one camera is displayed on the display, control the display to display a second partial image, which corresponds to a second direction different from the first direction, in the image on the display in response to the first input.

In accordance with an aspect of the present disclosure, a method for displaying an image by an electronic device is provided. The method includes displaying a first partial image, which corresponds to a first direction, in an image taken by at least one camera, and displaying a second partial image, which corresponds to a second direction different from the first direction, in the image in response to a first input when the first input is received while the first partial image, which corresponds to the first direction, is displayed.

In accordance with another aspect of the present disclosure, a storage medium storing instructions is provided. The storage medium includes the instructions are set for at least one processor to perform at least one operation when executed by the at least one processor, the at least one operation including displaying a first partial image, which corresponds to a first direction, in an image taken by at least one camera, and displaying a second partial image, which corresponds to a second direction different from the first direction, in the image in response to a first input when the first input is received while the first partial image, which corresponds to the first direction, is displayed.

In various embodiments, images based on various viewpoint may be displayed according to the view mode selected by a user from among a plurality of view modes. Further, there may be provided a method for updating an image based on a change in the gaze of the user wearing an HMD and/or the movement of the head.

In various embodiments, a user may select a desired viewing direction (that is, gaze) from among a plurality of gaze directions, a captured 360-degree image being viewed from different positions, and thus may view an image corresponding to various gaze directions.

In various embodiments, when a movement is detected, for example, when a user wearing an HMD turns his/her head, an image of a different portion may be displayed in response to the detected movement based on a gaze direction selected by the user, thus improving realism.

In various embodiments, a key region (field of view, gazing region, or region of interest (ROI)) of a 360-degree image, which corresponds to a user-desired user gaze direction, may be preferentially rendered, thereby providing the user with an immediate screen update without delay.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
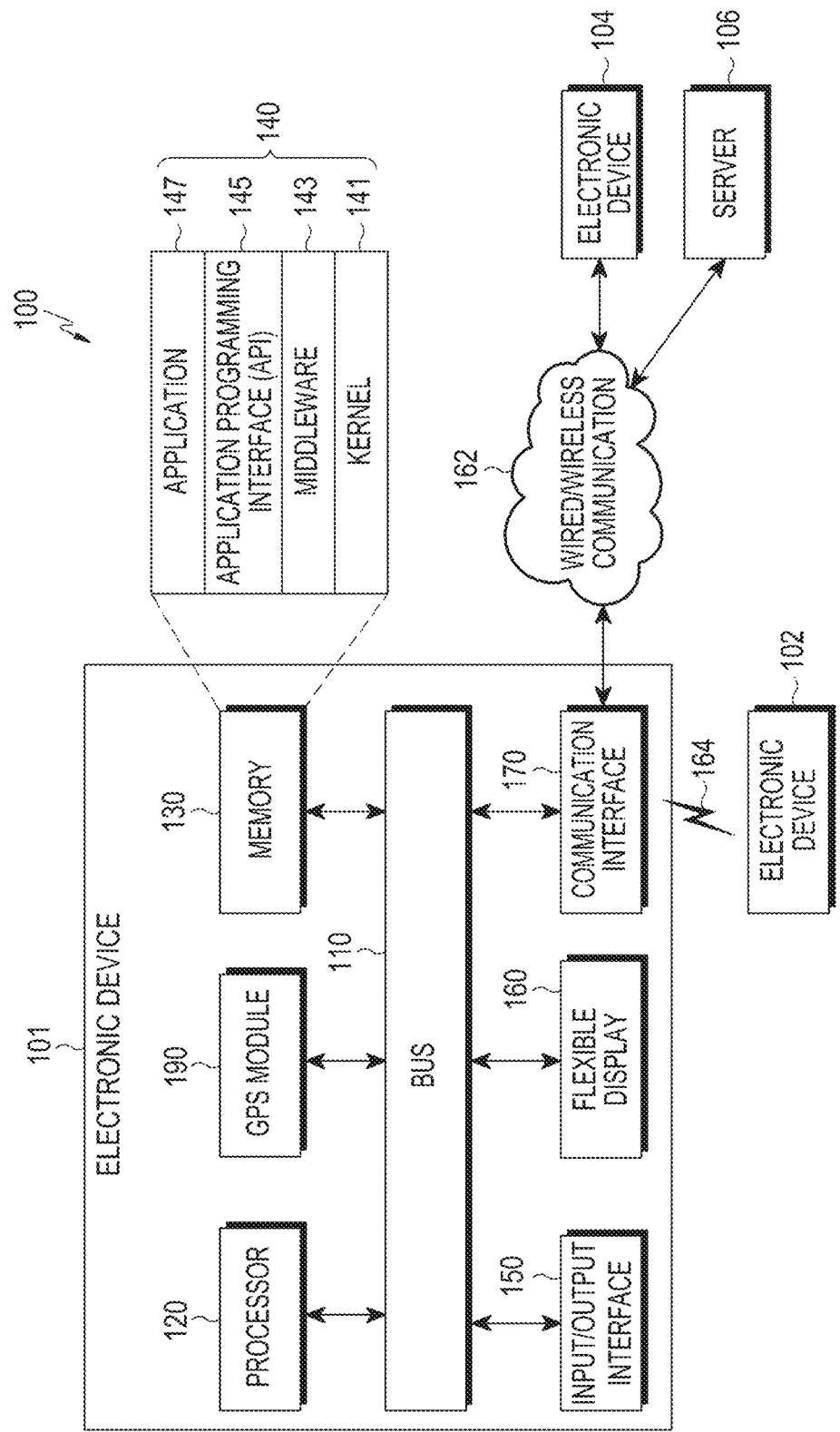
FIG. 1 illustrates an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element). The expression "a plurality" of may mean at least two.

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, or a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may also include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), Vehicle Infotainment Devices, an electronic devices for a ship (e.g., a navigation device for a ship, and a gyro-compass), avionics, security devices, an automotive head unit, a robot for home or industry, an automatic teller machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). The electronic device may include at least one of a part of furniture or a building/structure, an electronic board, an electronic signature receiving device, a projector, and various types of measuring instruments (e.g., a water meter, an electric meter, a gas meter, a radio wave meter, and the like).

The electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

FIG. 1 illustrates an electronic device in a network environment according to an embodiment of the present disclosure.

Referring to FIG. 1, the electronic device 101 of the network environment 100 may include a bus 110, a processor 120, a memory 130, an input/output interface 150, a display 160, a communication interface 170, and a global positioning system (GPS) module 190. In some embodiments, at least one of the components may be omitted, or an additional component may be further included in the electronic device 101. The bus 110 may include a circuit that connects the components 110 to 170 to each other and delivers communications (e.g., control messages or data) between the components. The processor 120 may include one or more of a central processing unit, an application processor, and a communication processor (CP). The processor 120 may control, for example, at least one different component of the electronic device 101, and/or may perform an operation relating to communication or data processing.

The memory 130 may include a volatile and/or nonvolatile memory. The memory 130 may store a command or data related to at least one different component of the electronic device 101. According to one embodiment, the memory 130 may store software and/or a program 140. The program 140 may include a kernel 141, middleware 143, an application programming interface (API) 145, and/or an application program (application) 147. At least part of the kernel 141, the middleware 143, and the API 145 may be designated as an operating system. The kernel 141 may control or manage system resources (e.g., the bus 110, the processor 120, the memory 130, or the like) used to perform an operation or function implemented in other programs (e.g., the middleware 143, the API 145, or the application program 147). The kernel 141 may provide an interface that allows the middleware 143, the API 145, or the application program 147 to access individual components of the electronic device 101 to thereby control or manage system resources.

The middleware 143 may serve as a relay so that, for example, the API 145 or the application program 147 communicates with the kernel 141 to exchange data. The middleware 143 may process one or more requests for operations received from the application program 147 according to priority. The middleware 143 may assign at least one application program 147 a priority for using a system resource (e.g., the bus 110, the processor 120, the memory 130, or the like) of the electronic device 101, and may process one or more requests for operations.

The API 145 is an interface for the application 147 to control a function provided from the kernel 141 or the middleware 143, and may include, for example, at least one interface or function (e.g., a command) for file control, window control, image processing, or text control. The input/output interface 150 may deliver a command or data, which is input from a user or a different external device, to one or more different components of the electronic device 101, or may output a command or data, which is received from one or more different components of the electronic device 101, to the user or different external device.

The display 160 may include a liquid crystal display (LCD), a light-emitting diode (LED) display, an organic light-emitting diode (OLED) display, a micro-electro-mechanical Systems (MEMS) display, and an electronic paper display. The display 160 may display, for example, various types of content (e.g., text, an image, a video, an icon, a symbol, and/or the like) for the user. The display 160 may include a touch screen and may receive touch, gesture, proximity, or hovering input using, for example, an electronic pen or a body part of a user.

The communication interface 170 may establish communication, for example, between the electronic device 101 and an external device (e.g., a first external electronic device 102, a second external electronic device 104, or a server 106). For example, the communication interface 170 may be connected to a network 162 or 164 via wireless communication or wired communication to communicate with the external device (e.g., the second external electronic device 104 or the server 106).

The wireless communication may include cellular communication using, for example, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). The wireless communication may include, for example, at least one of Wi-Fi, Bluetooth (BT), Bluetooth low energy (BLE), ZigBee, near field communication (NFC), magnetic secure transmission (MST), radio frequency (RF), and a body area network (BAN). The wireless communication may also include a global navigation satellite system (GNSS). The GNSS may be, for example, a GPS, a global navigation satellite system (GLONASS), a Beidou navigation satellite system ("Beidou"), or Galileo, which is the European global satellite-based navigation system. In the present document, "GPS" may be interchangeably used with "GNSS" hereinafter. The wired communication may include, for example, at least one of universal serial bus (USB), high definition multimedia interface (HDMI), recommended standard 232 (RS-232), Power Line Communication, and plain old telephone service (POTS). The network 162 may include a telecommunications network, which may be, for example, at least one of a computer network (for example, a local area network (LAN) or wide area network (WAN)), the Internet, and a telephone network.

The first and second external electronic devices 102 and 104 may each be a device of a type that is the same as, or different from, the electronic device 101. According to various embodiments, all or part of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (e.g., the electronic device 102 or 104, or the server 106) to perform at least some functions related to the function or service, instead of, or in addition to, autonomously performing the function or service. The other electronic device (e.g., the electronic device 102 or 104, or the server 106) may perform the requested functions or additional functions, and may transmit the result thereof to the electronic device 101. The electronic device 101 may provide the requested function or service using the same received result or by additionally processing the result. To this end, cloud-computing, distributed-computing, or client-server-computing technologies may be used.

Figure 2:
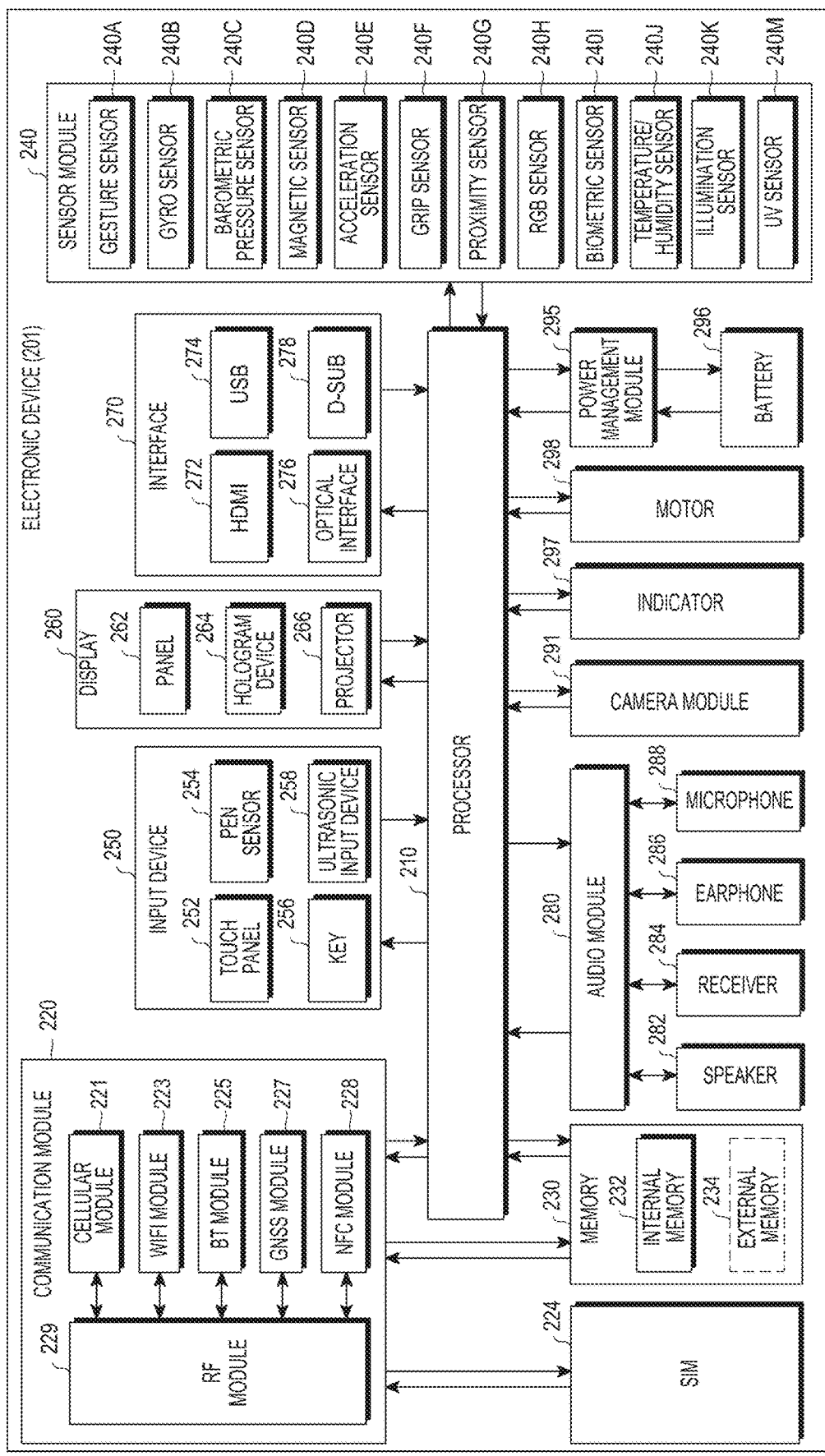
FIG. 2 is a block diagram of an electronic device according to an embodiment of the present disclosure.

FIG. 2 is a block diagram of an electronic device according to an embodiment of the present disclosure.

Referring to FIG. 2, the electronic device 201 may include all or part of the electronic device 101 illustrated in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processors 210 may run an operating system or an application program to control a plurality of hardware or software components that are connected to the processors 210, and may perform various kinds of data processing and operations. The processors 210 may be configured as a system on chip (SoC). According to one embodiment, the processors 210 may further include a graphic processing unit (GPU) and/or an image signal processor. The processors 210 may include at least some of the components illustrated in FIG. 2, such as a cellular module 221. The processors 210 may load a command or data received from at least one other component (e.g., nonvolatile memory) into volatile memory to process the command or data, and may store resultant data in the nonvolatile memory.

The communication module 220 (e.g., the communication interface 170) may include the cellular module 221, a Wi-Fi module 223, a Bluetooth module 225, a GNSS module 227, an NFC module 228, and an RF module 229. The cellular module 221 may provide, for example, a voice call, a video call, a text messaging service, or an Internet service through a communication network. According to one embodiment, the cellular module 221 may perform identification and authentication of the electronic device 201 in a communication network using the SIM (e.g. SIM card) 224. The cellular module 221 may perform at least part of the functions provided by the processors 210. The cellular module 221 may include a CP. At least two or more of the cellular module 221, the Wi-Fi module 223, the Bluetooth module 225, the GNSS module 227, and the NFC module 228 may be included in one integrated chip (IC) or IC package. The RF module 229 may transmit and receive a communication signal (e.g., an RF signal). The RF module 229 may include a transceiver, a power amplifier (amp) module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module. The SIM 224 may include a card including an SIM or an embedded SIM, and may include unique identification information (for example, an integrated circuit card identifier (ICCID)) or subscriber information (for example, an international mobile subscriber identity (IMSI)).

The memory 230 (e.g., the memory 130) may include an internal memory 232 or an external memory 234. The internal memory 232 may include, for example, at least one of a volatile memory (e.g., a dynamic random access memory (DRAM), an static RAM (SRAM), an synchronous dynamic RAM (SDRAM), or the like) and a nonvolatile memory (for example, a one-time programmable ROM (OTPROM), a PROM, an EPROM, an EEPROM, a mask ROM, a flash ROM, a flash memory, a hard drive, or a solid state drive (SSD)). The external memory 234 may include a flash drive, a compact flash (CF), a secure digital (SD) memory, a micro-SD memory, a mini-SD memory, an extreme digital (xD) memory, a multi-media card (MMC), a memory stick, or the like. The external memory 234 may be functionally or physically connected to the electronic device 201 through any of various interfaces.

The sensor module 240 may measure physical quantities, or may detect the state of operation of the electronic device 201 and convert measured or detected information into an electrical signal. The sensor module 240 may include at least one of a gesture sensor 240A, a gyro sensor 240B, a barometric pressure sensor 240C, a magnetic sensor 240D, an accelerometer 240E, a grip sensor 240F, a proximity sensor 240G a color sensor 240H (e.g., a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as part of the processors 210 or separately from the processors 210, to control the sensor module 240, thereby controlling the sensor module 240 while the processors 210 are in a sleep state.

The input device 250 may include a touch panel 252, a (digital) pen sensor 254, a key 256, or an ultrasonic input device 258. The touch panel 252 may be at least one of an electrostatic type, a pressure-sensitive type, an infrared type, and an ultrasonic type. The touch panel 252 may further include a control circuit. The touch panel 252 may further include a tactile layer to provide a user with a tactile response. The (digital) pen sensor 254 may be part of the touch panel or may include a separate recognition sheet. The key 256 may include a physical button, an optical key, or a keypad. The ultrasonic input device 258 may detect ultrasonic waves generated in an input tool through a microphone (e.g., a microphone 288) and may identify data corresponding to the detected ultrasonic waves.

The display 260 (e.g., the display 160) may include a panel 262, a hologram device 264, a projector 266, and/or a control circuit to control the panel 262, the hologram device 264, or the projector 266. The panel 262 may be configured to be flexible, transparent, or wearable. The panel 262 may be formed with the touch panel 252 in one or more modules. The panel 262 may include a pressure sensor (or force sensor) to measure the strength of pressure of a user's touch. The pressure sensor may be formed with the touch panel 252 in a single body, or may be provided as one or more sensors separate from the touch panel 252. The hologram device 264 may display a three-dimensional image in the air using the interference of light. The projector 266 may project light onto a screen to display an image. The screen may be disposed inside or outside the electronic device 201. The interface 270 may include an HDMI 272, a USB 274, an optical interface 276, or a D-subminiature (D-sub) interface 278. The interface 270 may be included, for example, in the communication interface 170 illustrated in FIG. 1. Additionally or alternatively, the interface 270 may include a mobile high-definition link (MHL) interface, an SD card/MMC interface, or an Infrared Data Association (IrDA) interface.

The audio module 280 may bi-directionally convert sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288. The camera module 291 is a device that takes, for example, a still image and a video. According to one embodiment, the camera module 291 may include one or more image sensors (for example, a front sensor or a rear sensor), a lens, an image signal processor (ISP), or a flash (for example, an LED, a xenon lamp, or the like). The power management module 295 may manage, for example, the power of the electronic device 201. According to one embodiment, the power management module 295 may include a power management integrated circuit (PMIC), a charger IC, or a battery or fuel gauge. The PMIC may have wired and/or wireless charging methods. The wireless charging methods may include a magnetic-resonance method, a magnetic-induction method, or an electromagnetic-wave method. The power management module 295 may further include an additional circuit for wireless charging, such as a coil loop, a resonance circuit, or a rectifier. The battery gauge may measure, for example, the remaining battery charge, the charging voltage, the current, or the temperature of the battery 296. The battery 296 may include a rechargeable battery and/or a solar battery.

The indicator 297 may display the specific state of the electronic device 201 or a component thereof (e.g., the processors 210), which may be a booting state, a message state, or a charging state. The motor 298 may convert an electrical signal into mechanical vibrations, and may generate vibrations or a haptic effect. The electronic device 201 may include a mobile TV support device (e.g., a graphics processing unit (GPU)) that is capable of processing media data in accordance with, for example, digital multimedia broadcasting (DMB), digital video broadcasting (DVB), or mediaFlo™ standards. Each element mentioned in the present document may include one or more components, and may be designated by different terms depending on the type of electronic device. In various embodiments, an electronic device (for example, the electronic device 201) may be configured such that some components are omitted, additional components are further included, or some of the components are combined into one entity, but may perform the same functions as those of the corresponding components before combination.

Figure 3:
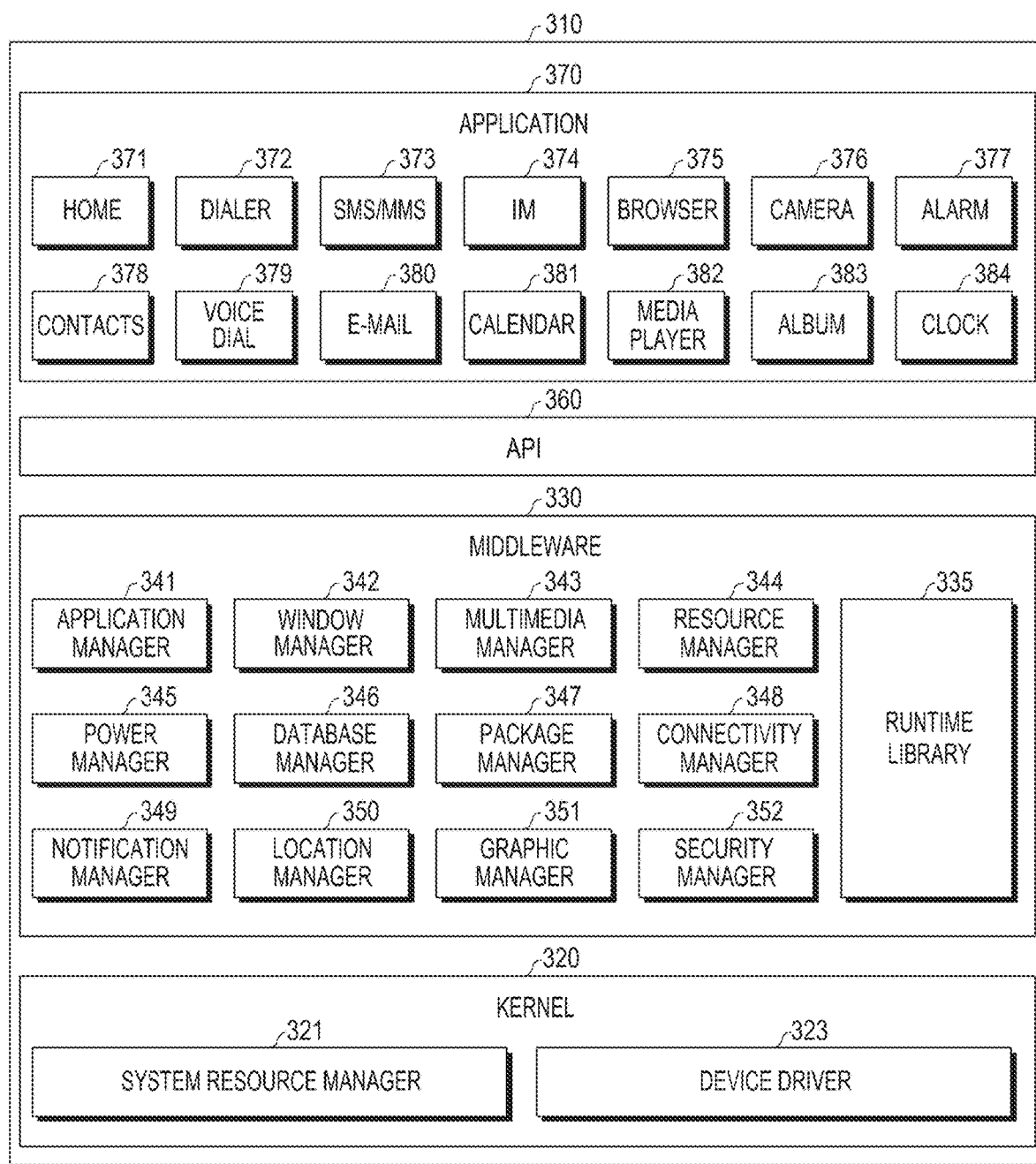
FIG. 3 is a block diagram of a program module according to an embodiment of the present disclosure.

FIG. 3 is a block diagram of a program module according to an embodiment of the present disclosure.

Referring to FIG. 3, the program module 310 (e.g., the program 140) may include an operating system that controls resources related to an electronic device (e.g., the electronic device 101) and/or various applications (e.g., the application program 147) that run on the operating system. The operating system may include, for example, Android™, iOS™, Windows™, Symbian™, Tizen™, Bada™, or the like.

Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least part of the program module 310 may be preloaded onto the electronic device or may be downloaded from an external electronic device (e.g., the electronic device 102 or 104, the server 106, or the like).

The kernel 320 may include a system resource manager 321 and/or a device driver 323. The system resource manager 321 may perform control, allocation, or recovery of system resources. The system resource manager 321 may include a process manager, a memory manager, or a file system manager. The device driver 323 may include a display driver, a camera driver, a Bluetooth driver, a shared memory driver, a USB driver, a keypad driver, a Wi-Fi driver, an audio driver, or an inter-process communication (IPC) driver. The middleware 330 may provide functions commonly needed for applications 370, or may provide an application 370 with various functions through the API 360 so that the application 370 may use the limited systems resources in the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler to add a new function through a programming language while the application 370 is running. The runtime library 335 may perform input/output management, memory management, or arithmetic function processing. The application manager 341 may manage the life cycle of the application 370. The window manager 342 may manage graphic user interface (GUI) resources used for a screen. The multimedia manager 343 may identify formats that are necessary to play media files, and may encode or decode a media file using a codec suitable for a corresponding format. The resource manager 344 may manage source code or memory space for the application 370. The power manager 345 may manage battery capacity or power supply, and may provide information on power necessary for the operation of the electronic device. The power manager 345 may interwork with a basic input/output system (BIOS). The database manager 346 may generate, retrieve, or change a database to be used for the application 370. The package manager 347 may install or update an application distributed in the form of a package file.

The connectivity manager 348 may manage wireless connectivity. The notification manager 349 may provide a user with an event, such as an incoming message, an appointment, or a proximity notification. The location manager 350 may manage information about the location of the electronic device. The graphic manager 351 may manage a graphic effect to be provided for the user or a user interface related to the graphic effect. The security manager 352 may provide system security or user authentication. The middleware 330 may include a telephony manager to manage a voice or video call function of the electronic device or a middleware module that is capable of forming combinations of functions of the foregoing elements. The middleware 330 may provide a specialized module for each operating system. The middleware 330 may dynamically delete some of the existing elements or add new elements. The API 360 is, for example, a set of API programming functions, and may be provided with a different configuration depending on the operating system. For example, one API set for each platform may be provided in the case of Android or iOS, while two or more API sets for each platform may be provided in the case of Tizen.

The application 370 may include a home 371, a dialer 372, an short message system (SMS)/multimedia message system (MIMS) 373, an Instant Message (IM) 374, a browser 375, a camera 376, an alarm 377, contacts 378, a voice dialer 379, an email 380, a calendar 381, a media player 382, an album 383, a clock 384, a health care application (for example, for measuring exercising or blood sugar), or an application providing environmental data (for example, atmospheric pressure, humidity, or temperature data).

According to one embodiment, the application 370 may include an information exchange application that is capable of supporting information exchange between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device, or may receive notification information from the external electronic device and provide the notification information to the user. The device management application may install, delete, or update, for example, a function (e.g., a function of turning on/turning off the external electronic device itself (or some components) or adjusting the brightness or resolution of a display) of an external electronic device communicating with the electronic device or an application operating in the external electronic device.

According to one embodiment, the application 370 may include an application (e.g., a health care application of a mobile medical device) assigned according to the attributes of the external electronic device. According to one embodiment, the application 370 may include an application received from the external electronic device. At least part of the program module 310 may be implemented (e.g., run) by software, firmware, hardware (e.g., the processor 210), or combinations of at least two or more thereof, and may include a module, a program, a routine, sets of instructions, or a process for performing one or more functions.

Figure 4A:
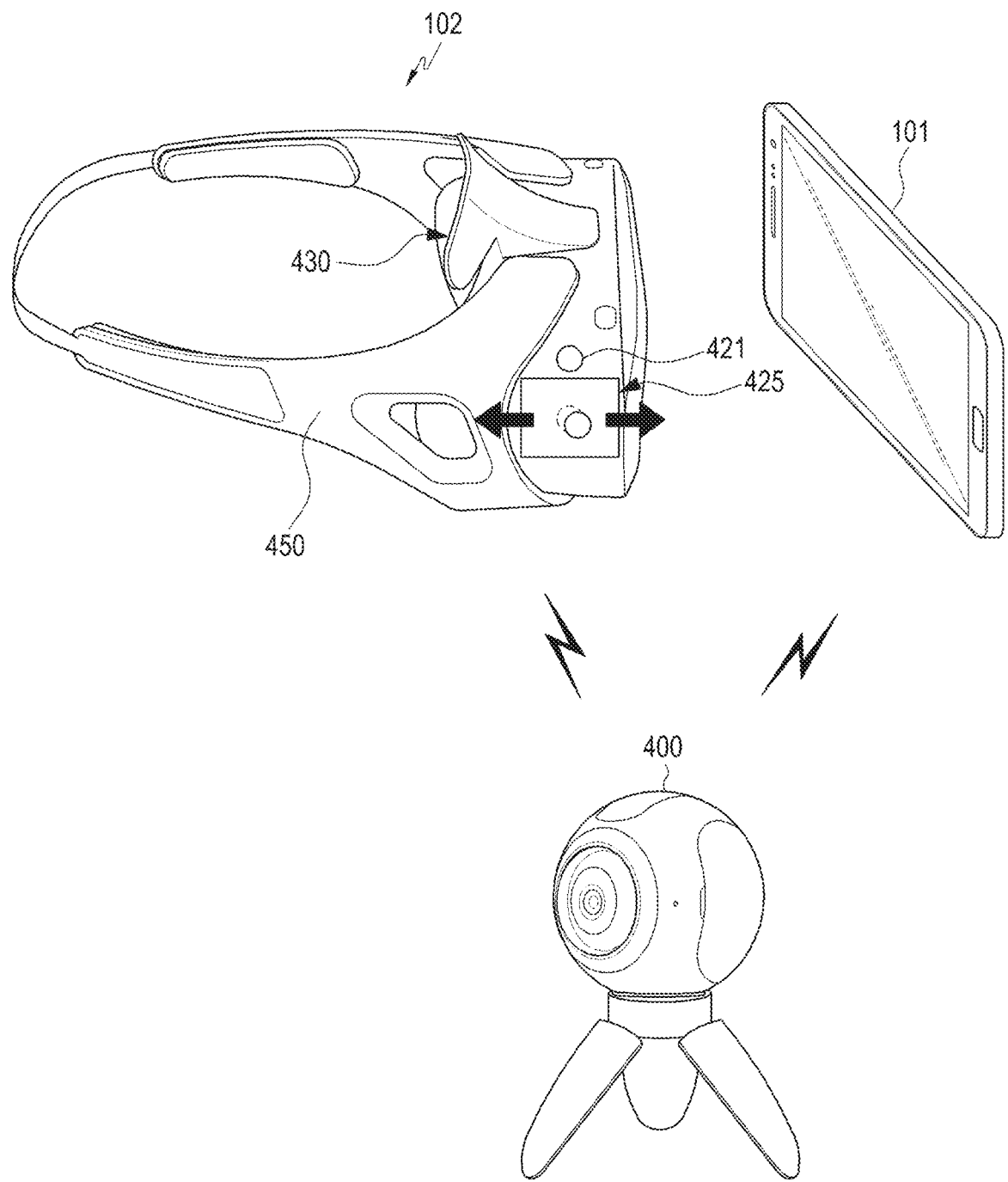
FIG. 4A illustrates electronic devices forming an image-processing system according to an embodiment of the present disclosure.

FIG. 4A illustrates electronic devices forming an image-processing system according to an embodiment of the present disclosure.

Referring to FIG. 4A, the image-processing system may include a photographing apparatus 400 and image-processing apparatuses 101 and 102.

The photographing apparatus 400 may photograph a 360-degree omnidirectional image based on a fixed viewpoint. The omnidirectional image is an image encompassing a view captured when a photographer rotates about a single central position and a view captured when the photographer looks up and down. The photographing apparatus 400 may include at least one lens or camera for taking an omnidirectional image.

For example, a fisheye lens may have a viewing angle of 180 degrees or wider. With the fisheye lens facing the sky, it is possible to capture a single image showing an area from the stars in the sky to the horizon. The photographing apparatus 400 may include a plurality of such fisheye lenses and may take an omnidirectional image. In another example, the photographing apparatus 400 may include a plurality of cameras, each having a predetermined viewing angle, to take an omnidirectional image. In this case, the plurality of cameras may be provided in the photographing apparatus 400 to cover all directions based on one point. In another example, the photographing apparatus 400 including one or more cameras may automatically and/or manually move (in pitch, yaw, and roll directions and the like) to take an omnidirectional image. In another example, the photographing apparatus 400 may include a plurality of cameras having a predetermined viewing angle corresponding to the left and right eyes of a user. In this case, the photographing apparatus 400 may take images in all directions to thereby capture a stereoscopic image including a plurality of omnidirectional images. It should be noted, however, that the photographing apparatus 400 is not limited to the foregoing examples.

The photographing apparatus 400 may capture not only an omnidirectional image but also an image in a certain direction (e.g., a tetragonal area viewed at 120 degrees in upward, downward, leftward, and rightward directions based on the lens of the photographing apparatus 400). Further, the photographing apparatus 400 may take images in all directions, may process images in some directions among the images in all direction, and may transmit the processed images to the image-processing apparatuses 101 and 102.

The photographing apparatus 400 may record a taken image and related metadata (e.g., a photographing direction, range, area, and position) in association with each other. For example, the photographing apparatus 400 may associate at least one of metadata (i.e., a position, motion information and direction information) received through a sensor, with at least one of camera property information (e.g., camera calibration parameters and photographing state information) and a taken image. The photographing apparatus 400 may include at least one sensor, for example, at least one of a GPS sensor, a Wi-Fi fingerprint sensor, a gyro sensor, an acceleration sensor, a geomagnetic sensor, and an altitude sensor, and may further include other sensors.

According to one embodiment, the photographing apparatus 400 may record a taken image and related metadata in association with each other, wherein the metadata may include sensing information, detected by the sensor when the image is taken, which is mapped (or associated) with identification information on each frame of the image.

According to one embodiment, the photographing apparatus 400 may record sensing information, detected when each frame of an image is taken, in association with each frame.

Sensing information associated with an image may include at least one of the position of the photographing apparatus 400, the direction of the photographing apparatus 400, and motion (or movement) information on the photographing apparatus 400.

The photographing apparatus 400 may also map a captured omnidirectional image to a two-dimensional plane image, may encode the mapped two-dimensional plane image, and may store the two-dimensional plane image in memory or may transmit the two-dimensional plane image to the image-processing apparatuses 101 and 102.

According to one embodiment, the photographing apparatus 400 is a virtual camera at an arbitrary position in a virtual-reality space (e.g., a three-dimensional (3D) space realized in a game), which may capture image information received in association with virtual objects in virtual reality based on the properties (for example, position, orientation, viewing angle, and range) of the virtual camera. For example, an avatar's viewpoint in a game corresponds to the field of view (FOV) of the virtual camera, and an image area of an object in virtual reality, which is displayed through the virtual camera, may be part of an omnidirectional image.

The image-processing apparatuses 101 and 102 are image playback apparatuses and may perform image rendering. The image-processing apparatuses 101 and 102 may receive a bitstream of a mapped two-dimensional plane image from the photographing apparatus 400 and may decode the bitstream. The image-processing apparatuses 101 and 102 may perform rendering using the decoded two-dimensional plane image and may display a rendered frame.

The image-processing apparatuses 101 and 102 may provide a rendered image to a user through multiple stages of an image-processing process, and the image-processing process that is performed in response to a viewpoint change will be described later.

The image-processing apparatuses 101 and 102 may be various electronic devices for processing images, such as a virtual-reality (VR) device including a head-mounted display (HMD), a smartphone, a PC, a TV, and a tablet PC.

The photographing apparatus 400 and the image-processing apparatuses 101 and 102 may include a communication module, such as a Wi-Fi module, a Bluetooth module, and a ZigBee module, to perform communication with each other.

The image-processing apparatuses may be an electronic device 101 such as a smartphone. The electronic device 101 may store a 3D application or a virtual-reality application and a 3D graphic library. A 3D application may be an application capable of providing a user with a screen that depicts a scene similar to the real world. In one embodiment, virtual reality may refer to a virtual space that can be viewed when rotating about a user, a center point, or camera. For example, virtual reality may be a virtual space capable of representing 360 degrees, such as 360-degree video, 360-degree image content, or a 3D graphic modeling space, rendered on a screen.

Such an image-processing apparatuses may be an electronic device 102 such as an HMD device. The electronic device 102 may be worn on a user's head to be fixed on the user's head even when the user is moving. The electronic device 101 may be connected to at least one of the photographing apparatus 400 and the electronic device 102. Accordingly, when the user wears the electronic device 102, the user can observe an image displayed on a display of the electronic device 101 or can watch an image received from the photographing apparatus 400.

The electronic device 102 may include a housing 450 provided to be worn on the user's head, a blackout portion 430 fixed to the housing 450 and provided in an area corresponding to the position of the user's eyes, and at least one input button 421 provided in one area of the housing 450. A separate input device (not shown), other than the at least one input button 421, may be used for inputs for the electronic device 102. The separate input device may be connected to the electronic device 102 in a wireless or wired manner, and may transmit the user's input (e.g., a gesture or voice) to the electronic device 102. The electronic device 102 may include an input pad 425 capable of receiving input (for example, swiping input) from the user.

The user can hold the blackout portion 430 up to his/her eyes, and thus the user may observe an image provided from the photographing apparatus 400, or may observe an image through a 3D application provided on the electronic apparatus 101, without interference from external light.

The electronic device 101 may be connected to the electronic device 102 in a wireless or wired manner. For example, the electronic device 101 may be connected to the electronic device 102 via USB, which is merely an example. It is readily understood by those skilled in the art that the two devices 101 and 102 may be connected by any method as long as data transmission and reception is possible between the two devices 101 and 102.

In one embodiment, the electronic device 101 and the electronic device 102 may be integrated into one HMD device (or HMD VR device).

In one embodiment, the photographing apparatus 400 may also be integrated with the electronic device 101 and the electronic device 102 into one HMD device.

Figure 4B:
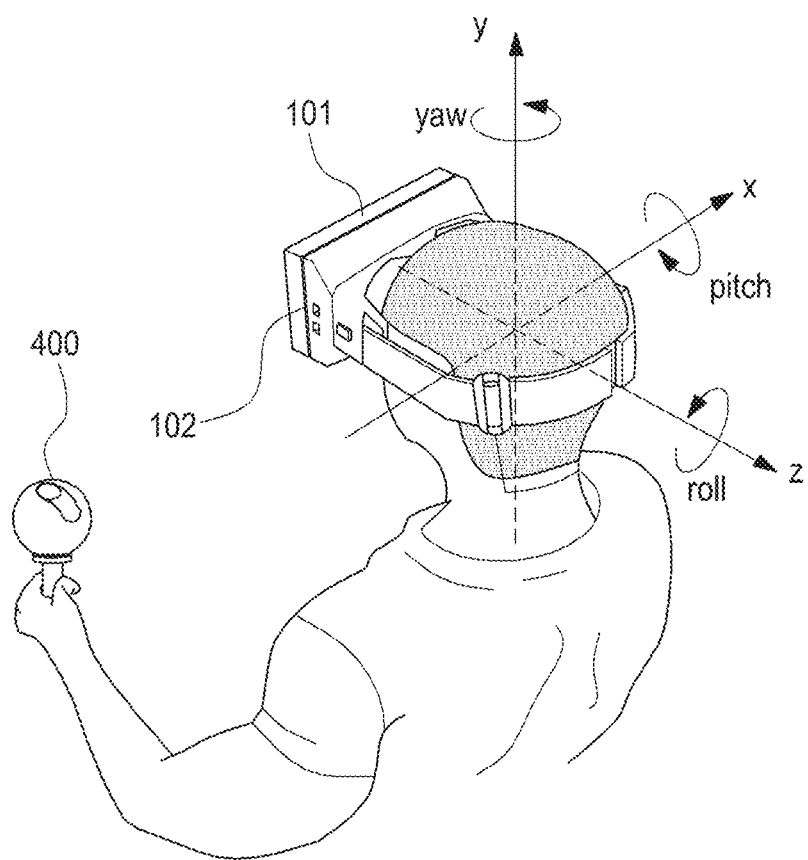
FIGS. 4B and 4C are perspective views illustrating a user wearing an head mounted display (HMD) device according to various embodiments of the present disclosure.

FIG. 4B is a perspective view illustrating a user wearing an HMD device according to an embodiment of the present disclosure.

Referring to FIG. 4B, the user can wear the housing of the electronic device 102 on the user's head and can take an image with the photographing apparatus 400. In addition, the electronic device 101 may be combined with the electronic device 102, and the user may view an image displayed on the display of the electronic device 101 as the image is received from the photographing apparatus 400.

The electronic device 101 may display an image taken by the photographing apparatus 400. The taken image is an image that is viewed when the user rotates 360 degrees, and the user may be provided with a virtual reality service by observing images appearing to the eyes.

A 3D application executed on the electronic device 101 may display an image that changes according to the movement (yaw, pitch, roll) of the user or the electronic devices 101 and 102.

Figure 4C:
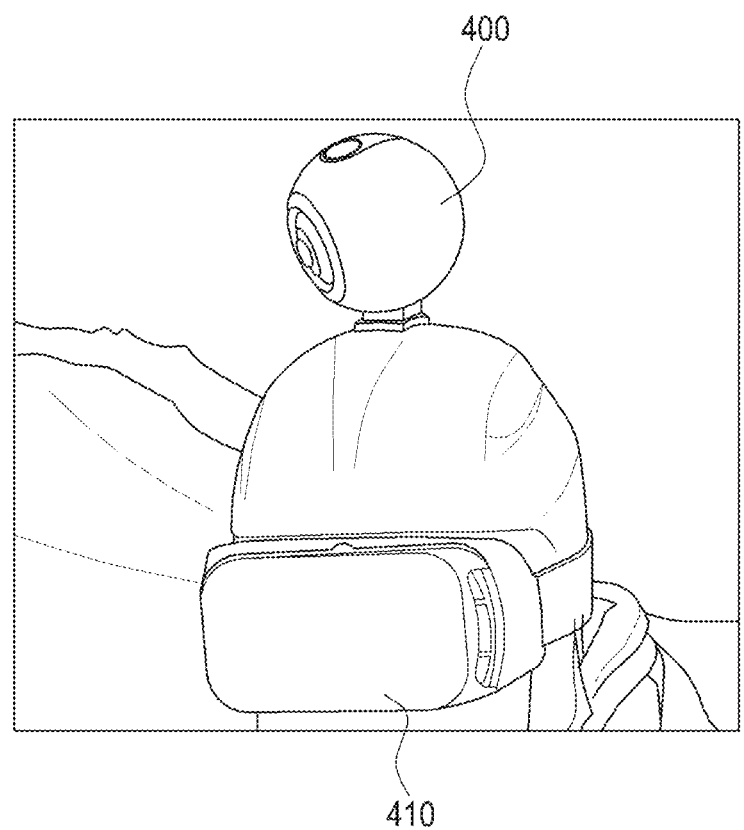

FIG. 4C is a perspective view illustrating a user wearing an HMD device, which shows a photographing apparatus fixed on the head of the user according to an embodiment of the present disclosure.

Referring to FIG. 4C, the photographing apparatus 400 may be used as an action camera. For example, when the user enjoys skiing, the photographing apparatus 400 may be mounted on the user's head to take downhill images while the user is freely skiing down a ski slope. The user may view the taken images through a display of the HMD device 410 while taking the images or thereafter. The photographing apparatus 400 may be disposed on the head of the user, where the user's view is less obstructed while the user is skiing, but the position of the photographing apparatus 400 is not limited thereto.

When an image is captured by the photographing apparatus 400 used as an action camera, the image may be taken in the direction in which the camera lens is oriented. When taking an image using the photographing apparatus 400, images are taken in all directions surrounding the user. Thus, the direction of the camera is fixed, but images may be taken in substantially all directions. Since an image such as a video is based on the camera lens, an image may be taken based on the direction of a main camera among a plurality of cameras.

According to one embodiment, when input for changing the viewpoint of the user is detected while the HMD device 410 is displaying an image corresponding to the direction of the main camera when playing images from the photographing apparatus 400, the HMD device 410 may display an image corresponding to a direction different from the direction of the main camera. The direction different from the direction of the main camera may be determined based on sensing information associated with the taken image. For example, based on the sensing information associated with the taken image, the HMD device 410 may display an image corresponding to the direction in which the photographing apparatus 400 is traveling (or moving).

Accordingly, a viewer may select a desired direction among various directions, such as not only the direction in which the main camera is oriented but also the direction in which the photographer is moving and the direction in which an event is occurring, to watch an image, thereby freely viewing all directions with different viewpoints at the time of photographing.

Figure 5A:
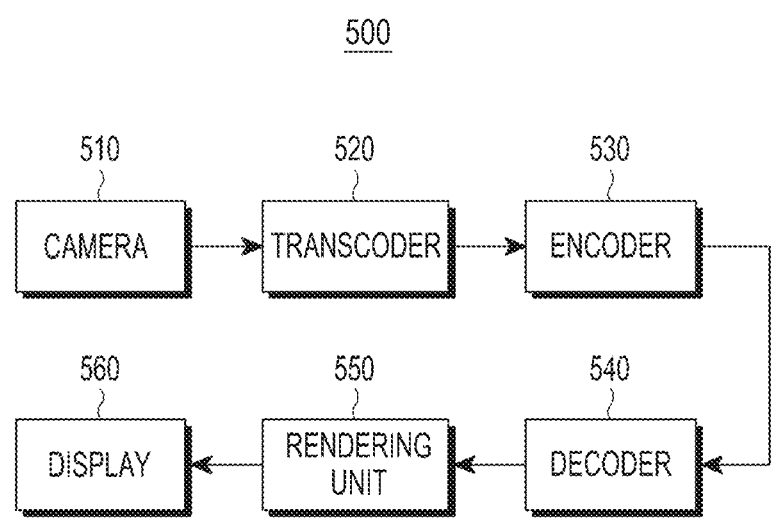
FIG. 5A is a block diagram illustrating an image-processing procedure according to an embodiment of the present disclosure.

FIG. 5A is a block diagram illustrating an image-processing procedure of an image-processing system according to an embodiment of the present disclosure.

Referring to 5A, in the image-processing system 500, an omnidirectional image (e.g., a 360-degree image) is sequentially processed by a camera 510, a transcoder 520, an encoder 530, a decoder 540, a rendering unit 550, and a display 560.

In FIG. 5A, it may be assumed that the camera 510, the transcoder 520, and the encoder 530 are included in a transmission end, and that the decoder 540, the rendering unit 550, and the display 560 are included in a reception end. For example, as shown in FIG. 4A, the transmission end and the reception end may be provided as the photographing apparatus 400 and the image-processing apparatuses 101 and 102, respectively. The image-processing system 500 is shown as divided into a transmission end and a reception end for the convenience of description; however, each component of the image-processing system 500 may be included in one device, or may be included in separate devices.

The camera 510 may take an omnidirectional image. For example, assuming that the camera 510 includes a pair of fisheye lenses with a viewing angle of 180 degrees or greater, the camera 510 may capture an omnidirectional image with the pair of fisheye lenses. The camera 510 may transmit two images taken using the pair of fisheye lenses to the transcoder 520. In another example, assuming that there is a plurality of cameras 510, the plurality of cameras 510 may capture spaces in different directions. In this case, the plurality of cameras 510 may generate separate images or a single two-dimensional image from a plurality of images taken in different directions and may transmit the separate images or the single image to the transcoder 520. In the foregoing examples, an image processed by the image-processing system 500 has been described as an image captured by the camera 510, but is not limited thereto. An image to be processed in the image-processing system 500 may be a virtual image (e.g., a game image or an animation image viewed from the viewpoint of a virtual camera in virtual space). In the above example, an image processed in the image-processing system 500 is an omnidirectional image, but may be an image of a space taken in one direction or in multiple directions. For example, the image-processing system 500 may process an image taken using one fisheye lens among the pair of fisheye lenses.

The transcoder 520 may map an omnidirectional image to a two-dimensional image. For example, the transcoder 520 may map two images taken with the fisheye lenses to a three-dimensional image and may map the three-dimensional image to a two-dimensional image. In this case, the transcoder 520 may map the omnidirectional image to the outer or inner surface of a virtual three-dimensional model in order to map the omnidirectional image to the three-dimensional image.

Further, the transcoder 520 may map an omnidirectional image to a two-dimensional image and may map a three-dimensional image to a two-dimensional image, and at the same time may generate metadata on the relationship between the coordinates of the mapped three-dimensional image and those of the mapped two-dimensional image.

The encoder 530 may encode a two-dimensional image transmitted from the transcoder 520. For example, the encoder 530 may perform encoding based on codec standards such as H.264, MPEG-4, HEVC and the like.

The encoder 530 may store encoded image data on the two-dimensional image in memory (not shown) as a video or still image. The encoder 530 may also transmit the encoded image data to another electronic device (not shown) in a streaming or file format. The stored or transmitted encoded image data may be transmitted to the decoder 540.

The memory (not shown) may store sensing information associated with an image, and the sensing information associated with the image may have a form in which sensing information on the capture of each frame of the image is stored for each frame. In addition, the sensing information associated with the image may be included in metadata on the image along with identification information of each frame of the image.

The metadata may be stored in the memory (not shown) or may be transmitted in a streaming or file format, along with the encoded image data. According to various embodiments, the metadata may be generated as a separate document (for example, an omnidirectional media application format (OMAF) document), and may be stored in association with the encoded image data, or may be transmitted in association with the encoded image data upon a request for the image data. In one example, the metadata may be automatically invoked along with the encoded image data in association with the encoded image data. The metadata may be transmitted together with or separately from the encoded image data upon a request for the encoded image data, or may be transmitted to a specified device or module separately from the request for the image data.

The reception end may include the decoder 540, the rendering unit 550, and the display 560. Hereinafter, a detailed description of portions overlapping those described above with reference to the transmission end will be omitted.

The decoder 540 may receive encoded image data from the encoder 530 and may decode the image data. The decoder 540 may perform decoding using the same codec standard (for example, H.264, MPEG-4, HEVC, and the like) as that used for encoding the mapped two-dimensional image in the encoder 530.

The rendering unit 550 may perform rendering based on a decoded two-dimensional image (hereinafter, input frame). The rendering unit 550 may additionally use metadata for rendering. The metadata may be generated on the transmission end and may be transmitted to the reception end, or may be previously stored in a storage unit (not shown) of the reception end. For example, when the metadata is encoded in JPEG on the transmission end, the metadata may be included in an exif field of JPEG When the metadata is compressed in MPEG-4 on the transmission end, the metadata may be included in an moov field of MPEG-4. Further, the metadata may be included at the end of a video frame.

The display 560 may display a rendered output frame.

In the above description, the image-processing system 500 is divided into the camera 510, the transcoder 520, the encoder 530, the decoder 540, the rendering unit 550, and the display 560 for the convenience of description. The foregoing configuration is merely an example, and the image-processing system 500 may be configured by including only some of the above-described components, or by combining some or all of the above-described components with other components. Although the transcoder 520, the encoder 530, the decoder 540, and the rendering unit 550 of the above-described components are described as being configured as physical hardware, the transcoder 520, the encoder 530, the decoder 540, and the rendering unit 550 may be provided as software performing the foregoing functions, may be stored in the memory, and may be loaded by a processor, such as a CPU or a GPU, to implement the functions.

According to one embodiment, a processor of an electronic device may be functionally connected to a display, and when a first input is received while a first partial image, which corresponds to a first direction, in an image taken by at least one camera is displayed on the display, the processor may be configured to display a second partial image, which corresponds to a second direction different from the first direction, in the image on the display in response to the first input. Here, the first partial image may correspond to a first portion of each frame of the taken image, and the second partial image may correspond to a second portion of the frame.

According to one embodiment, the first direction may be a reference direction in which a main camera provided in a photographing apparatus taking the image is pointed straight ahead, and the second direction may be a moving direction of the photographing apparatus, determined using sensing information associated with the image. The second direction may correspond to a gaze direction or to the movement of the head of the user wearing the electronic device.

According to one embodiment, the sensing information associated with the image may include at least one of a position of the photographing apparatus, a direction of the photographing apparatus, and movement information on the photographing apparatus.

According to one embodiment, the electronic device may further include at least one sensor that detects a movement of the electronic device, wherein the processor may be configured to display a third partial image, which corresponds to the first direction and is based on the movement of the electronic device, in the image on the display when the movement of the electronic device is detected by the sensor while the first partial image is displayed. For example, when the electronic device is an HMD device, the HMD device may display an FOV corresponding to an angle (or direction) to which the pose of the HMD device is applied based on the pose of a main camera when the movement of the HMD device is detected.

According to one embodiment, the processor may be configured to display a fourth partial image, which corresponds to the second direction and is based on the movement of the electronic device, in the image on the display when the movement of the electronic device is detected by the sensor while the second partial image is displayed. For example, when the electronic device is an HMD device, the HMD device may display an FOV corresponding to an angle (or orientation) to which the pose of the HMD device is applied based on a user-selected viewpoint (for example, a viewpoint in a traveling direction). The HMD device may display an FOV corresponding to an angle equal to the angle of the pose of the main camera minus the angle of the traveling direction plus the angle of the pose of the HMD device. Here, the image may be a 360-degree image.

According to one embodiment, the processor may be configured to detect whether an event occurs based on at least one of the sensing information associated with the image and information on a comparison between frames of the taken image when the image is played; and to display a fifth partial image, which corresponds to a direction of the occurring event, in the image on the display. The first partial image, the second partial image, the third partial image, the fourth partial image, and the fifth partial image may be at least partly overlapping images or the same image depending on the situation.

An operation in the encoder 530 of FIG. 5A is described below in detail with reference to FIGS. 5B and 5C.

Figure 5B:
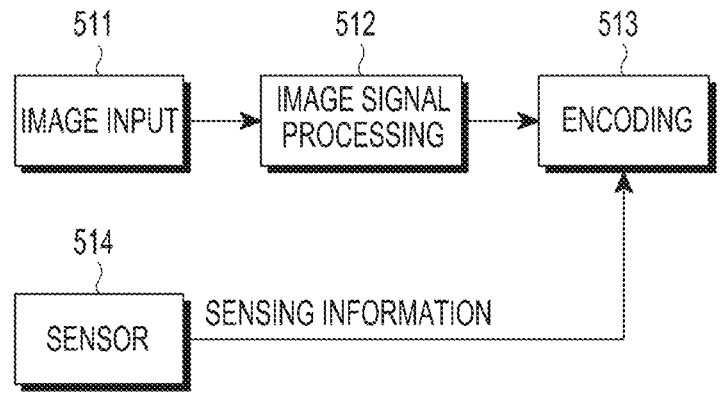
FIGS. 5B and 5C are block diagrams illustrating a process for storing sensing information associated with an image according to various embodiments of the present disclosure.
Figure 5C:
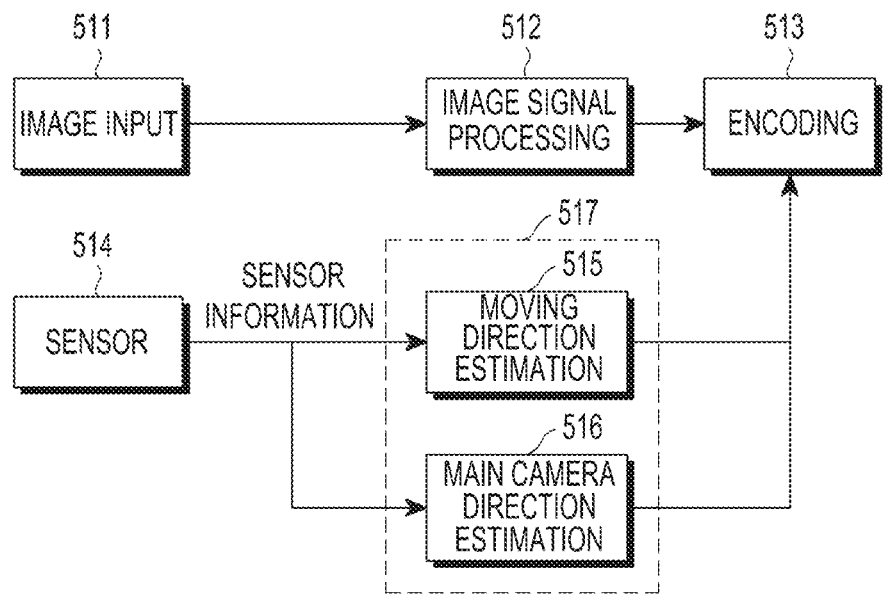

FIGS. 5B and 5C are block diagrams illustrating a process for storing sensing information associated with an image according to various embodiments.

Referring to FIG. 5B, when an image is input through the camera at operation 511, the photographing apparatus 400 may perform input image signal processing at operation 512 and may perform encoding at operation 513 along with sensing information acquired by a sensor at operation 514. An image signal processing operation is an operation for mapping an omnidirectional image to a two-dimensional image and may include warping, seam finding, blending, remapping, or the like. The sensing information associated with the image, which is encoded along with the image, is sensing information acquired through the sensor of the photographing apparatus 400 when capturing an image, and may include at least one of values from an acceleration sensor, a gyro sensor, a geomagnetic sensor, a GPS, and an altitude sensor.

Referring to FIG. 5C, the photographing apparatus 400 may perform an operation of calculating direction information at operation 517 using the sensing information from at least one sensor at operation 514. The operation of calculating the direction information may include operation 515 of estimating a moving direction and operation 516 of estimating a main camera direction. The photographing apparatus 400 may compute a camera pose/head pose and a moving direction (trajectory or traveling direction) based on the sensing information. The camera pose may include the position, orientation, and motion (or movement) of the camera, and the head pose may include the position, orientation, and motion (or movement) of the photographing apparatus 400 equipped with the camera. The photographing apparatus 400 may compute the moving direction and the main camera direction in real time when taking an image.

The main camera direction is a reference direction in which a main camera among a plurality of cameras provided in the photographing apparatus is pointed straight ahead, and the moving direction may indicate the direction in which the photographing apparatus is moving.

When the photographing apparatus 400 encodes each frame of the image at operation 513, the photographing apparatus 400 may also encode sensing information on the capture of each frame along with each frame. When each frame of the image has a structure capable of being stored along with the sensing information on the capture of each frame, the sensing information may be encoded in a form that is inserted into each frame. According to one embodiment, when the structure of each frame of the image has an extra field, such as a user data field, information on the moving direction and information on the camera pose or head pose, which are computed together with the sensing information, may also be encoded in a form of being inserted into each frame.

For example, when encoding is performed using an encoder, such as an MPEG-4 encoder, the sensing information on each frame of the image or computed direction information (e.g., the information on the moving direction information and the information on the camera pose or head pose) may also be stored. When there is no extra field in the structure of each frame, the sensing information or computed direction information may be stored as a separate file (or metadata) along with identification information (e.g., a sequence number) of each frame.

Although FIG. 5C illustrates the case where the photographing apparatus 400 computes direction information (e.g., a moving direction, a camera pose, a head pose, or the like) based on sensing information, a computing operation may be performed in an external device, for example, a separate server or an image playback apparatus.

The foregoing pieces of direction information, computed based on the sensing information, may be used to set a key region (field of view, gazing region, or region of interest (ROI)) of a 360-degree image, which corresponds to the direction of a user-desired viewpoint. For example, values computed based on the sensing information may be used so that the user may select the direction of a desired view (that is, a viewpoint) among the directions of viewpoints from which a captured 360-degree image is viewed at different positions.

Figure 5D:
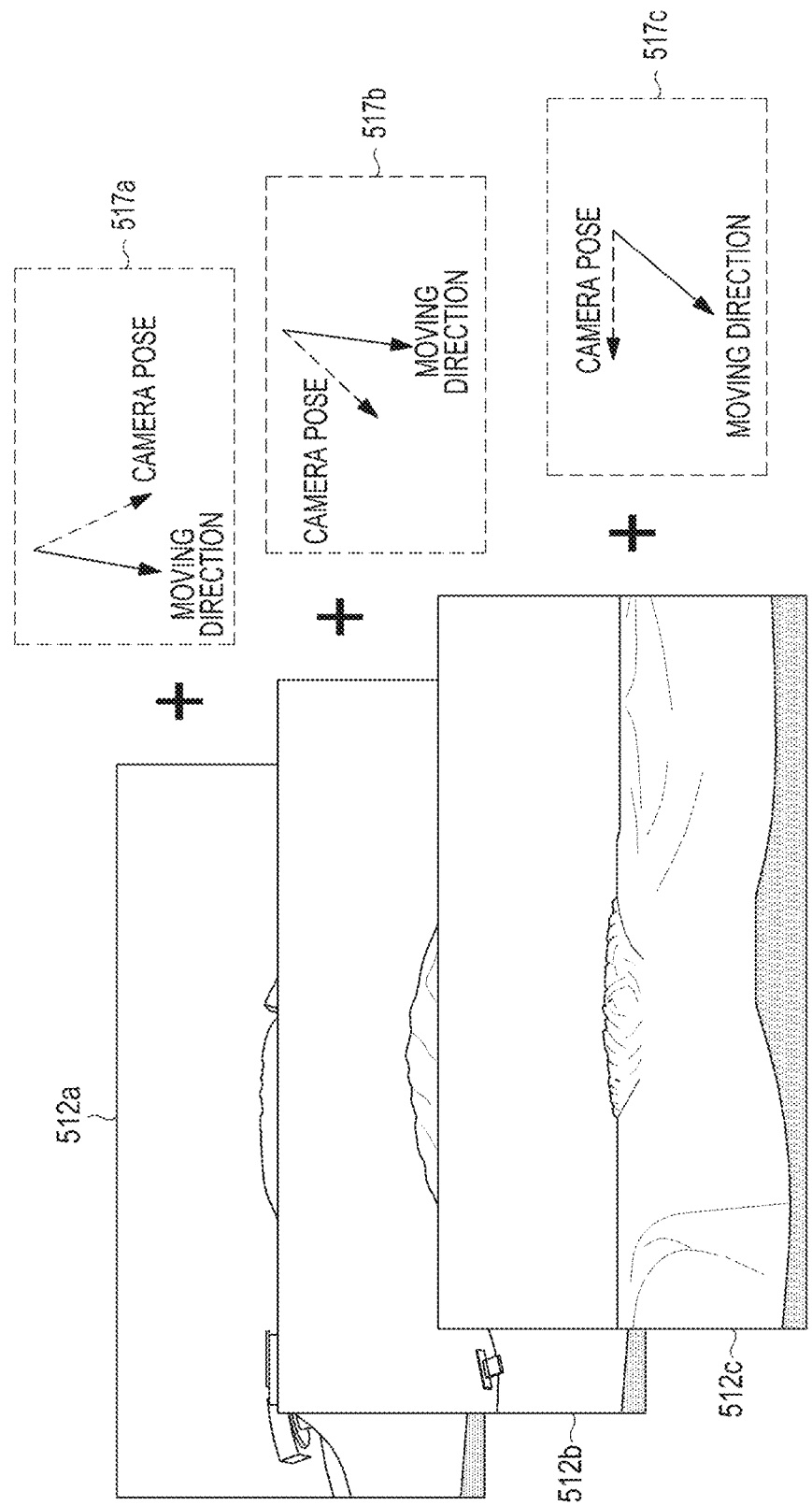
FIG. 5D illustrates a method for associating image data and pieces of computed direction information according to an embodiment of the present disclosure.

FIG. 5D illustrates a method for associating image data and pieces of computed direction information according to an embodiment of the present disclosure.

Referring FIG. 5D, direction information (e.g., a moving direction, a camera pose, or the like) 517a, 517b, and 517c, computed with respect to individual frames 512a, 512b, and 512c of the image, may be encoded in association with the individual frames 512a, 512b, and 512c. When an operation of computing direction information using sensing information is performed in the photographing apparatus 400 in real time at the time of acquiring the sensing information, as illustrated in FIG. 5D, the direction information 517a, 517b, and 517c, computed with respect to the individual frames 512a, 512b, and 512c of the image, may be encoded in association with the individual frames 512a, 512b, and 512c. However, when an operation of computing direction information is performed in an external device, for example, a separate server or an image playback apparatus, sensing information may be encoded in association with the individual frames 512a, 512b, and 512c, instead of the direction information computed with respect to the individual frames 512a, 512b, and 512c. Accordingly, the computation of direction information using sensing information associated with an image may be performed upon requesting the playback of the image or upon decoding the image.

Figure 6:
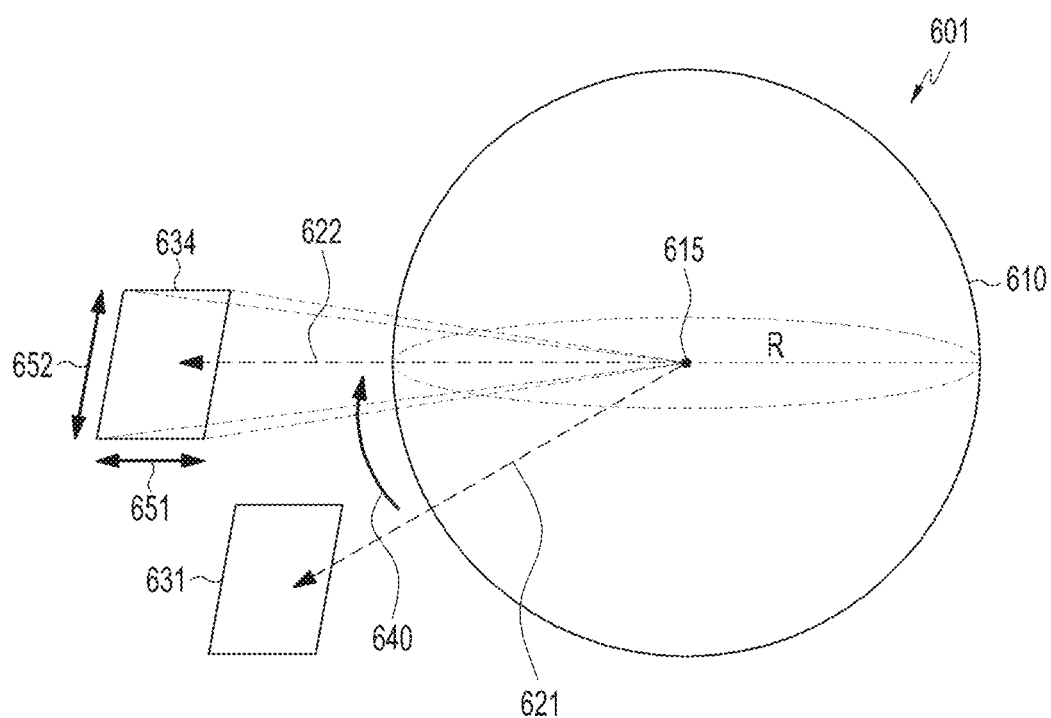
FIG. 6 illustrates a three-dimensional (3D) space according to an embodiment of the present disclosure.

FIG. 6 illustrates a 3D space according to an embodiment of the present disclosure.

Referring to FIG. 6, the 3D space 601 may be realized by at least one of an electronic device (e.g., the electronic device 101, 102, or 410), a processor of an electronic device, or a controller of an electronic device.

The 3D space 601 may be realized by performing texture mapping of a wide-angle image/video to a preset 3D model 610 (e.g., a sphere having a preset radius R, a cube, or a cylinder) and by disposing a user viewpoint or a virtual camera at a position in the 3D model, such as a center point 615.

The electronic device may render a first partial image 631 (or a first screen) corresponding to a first area of the 3D space 601 according to a first viewpoint (e.g., the viewpoint of a main camera) 621, and may display the first partial image 631 on a display (e.g., the display 160).

The electronic device may render a second partial image 634 (or a second screen) corresponding to a second area of the 3D space 601 according to a selection of a view mode or an input for viewpoint change (i.e., according to an angle 640 changed from the first viewpoint 621 to a selected viewpoint 622), and may display the second partial image 634 on the display (e.g., the display 160).

In the 3D space 601, a camera/user view (rendering viewport or rendering area) may be controlled by a horizontal FOV 651 and a vertical FOV 652. A 3D application (or a virtual-reality application) may set planes (e.g., right/left/top/bottom/near/far planes) limiting/defining a rendering viewport to control the FOVs.

According to one embodiment of the disclosure, the viewpoint change may occur according to the motion of a user's body part (e.g., an eye, a head, or a torso), and a second image may be generated in response to the viewpoint change. According to one embodiment of the disclosure, the viewpoint change may occur or may be controlled by a signal received from an external device or an external user.

Figure 7A:
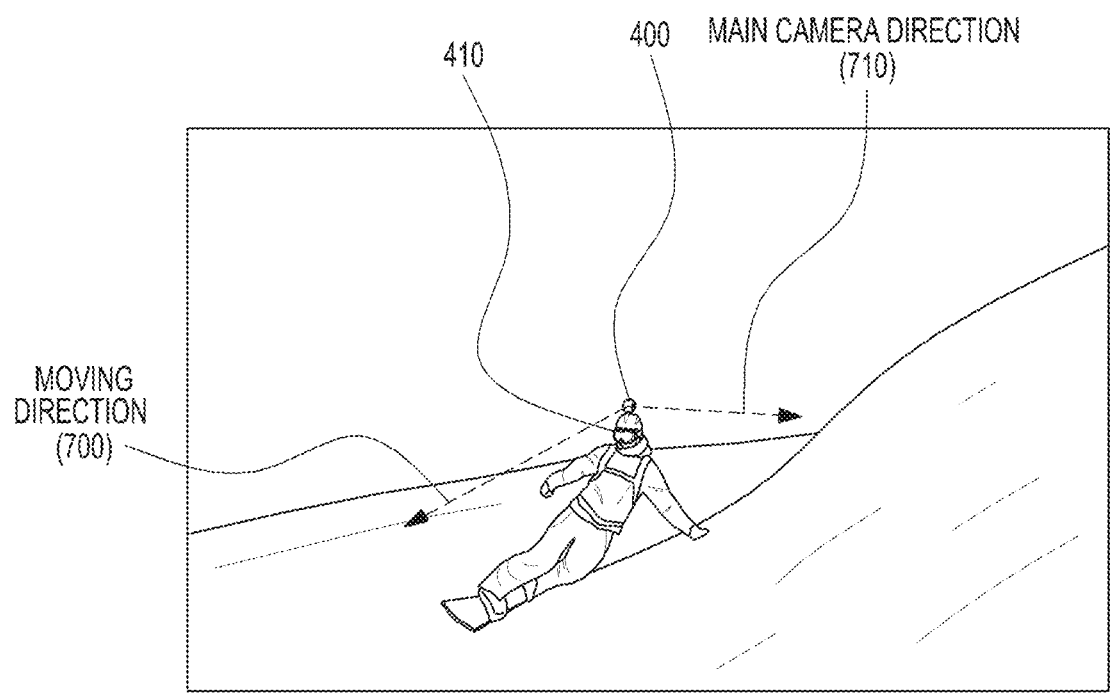
FIGS. 7A and 7B illustrate a camera direction and a moving direction in image capture according to various embodiments of the present disclosure.
Figure 7B:
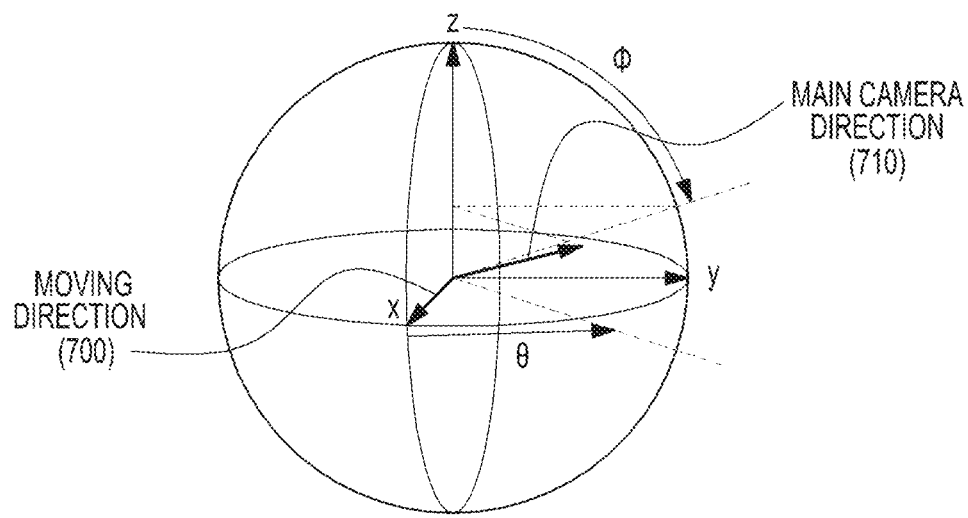

FIGS. 7A and 7B illustrate a camera direction and a moving direction in image capturing according to various embodiments of the present disclosure.

Referring to FIG. 7A, when a photographer captures downhill images while descending a ski slope, a main camera direction 710 may be different from the direction (trajectory direction or traveling direction) 700 in which the photographer is moving. For example, the main camera direction 710 faces the forward direction relative to the photographer, while the moving direction 700 of the photographer corresponds to the traveling direction in which the photographer skis downhill. Thus, the two directions may be different from each other. Therefore, in an omnidirectional image of FIG. 7B, a partial image corresponding to the main camera direction 710 may be different in position from a partial image corresponding to the moving direction 700.

Figure 8:
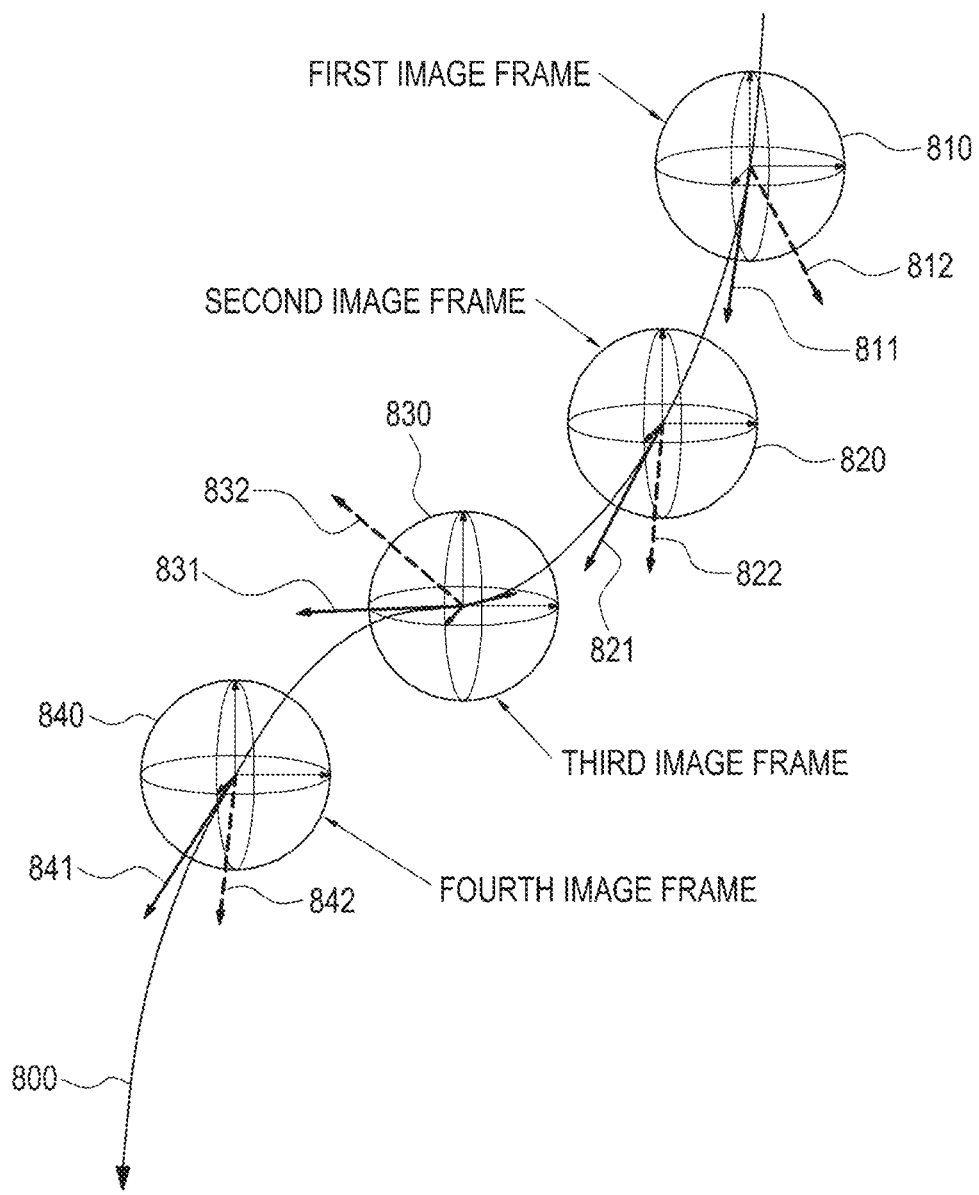
FIG. 8 illustrates a relationship between a camera direction and a moving direction according to a user movement path according to an embodiment of the present disclosure.

The relationship between the camera direction and the moving direction in each frame of an image captured when the photographer moves, for example, descends the slope, as illustrated in FIG. 8.

FIG. 8 illustrates the relationship between a camera direction and a moving direction according to a user movement path according to various embodiments of the present disclosure.

Referring to FIG. 8, each frame of a captured image according to a path of motion of a photographer 800 may be mapped to a 3D sphere. The photographing apparatus 400 may obtain a plurality of image frames captured at predetermined intervals according to the path of motion of the photographer 800, and the intervals between the frames may be the same. Each image frame is an image obtained according to a camera pose or a head pose, and a pose, such as the camera pose or head pose, may be derived based on, for example, an attitude and heading reference system (AHRS). The camera pose may be identified using the AHRS, for example, how much the camera is tilted on three axes (x, y, z axis), how many degrees the camera is tilted on the axes, how much the camera is rotated on the axes, or the like.

The photographing apparatus 400 may obtain a first image frame 810 at a first position, in which a first moving direction 811 is similar to the direction of the path of motion of a photographer 800, but a first camera pose 812 has a direction different from the first moving direction 811. Similarly, the photographing apparatus 400 may obtain a second image frame 820 at a second position, in which a second moving direction 821 is similar to the direction of the path of motion of a photographer 800, but a second camera pose 822 has a direction different from the second moving direction 821.

At a third position, where the direction changes rapidly on the slope, the angle between a third moving direction 831 and a third camera pose 832 may be wider. At the third position, where the direction of the user on the moving path changes rapidly, a third image frame 830 according to a third camera pose 832 in the opposite direction of the second camera pose 822 at the second position may be obtained. Subsequently, at a fourth position, a fourth image frame 840 according to a fourth moving direction 841 and a fourth camera pose 842 may be obtained.

As described above, when a photographer takes an image while moving, as shown in FIG. 8, each frame of an image may be obtained according to a camera viewing direction (camera pose or head pose) different from the direction in which the photographer is moving. The photographing apparatus 400 may obtain not only direction information on each frame of an image, for example, a main camera viewing direction (e.g., a camera pose or head pose) in each frame, but also a moving direction (trajectory) in each frame using sensor information (e.g., a sensor value from an acceleration sensor, a gyro sensor, a geomagnetic sensor, an altitude sensor, a GPS, or the like). A specific method for computing direction information using sensor information will be described with reference to FIGS. 12 to 13D.

Figure 9A:
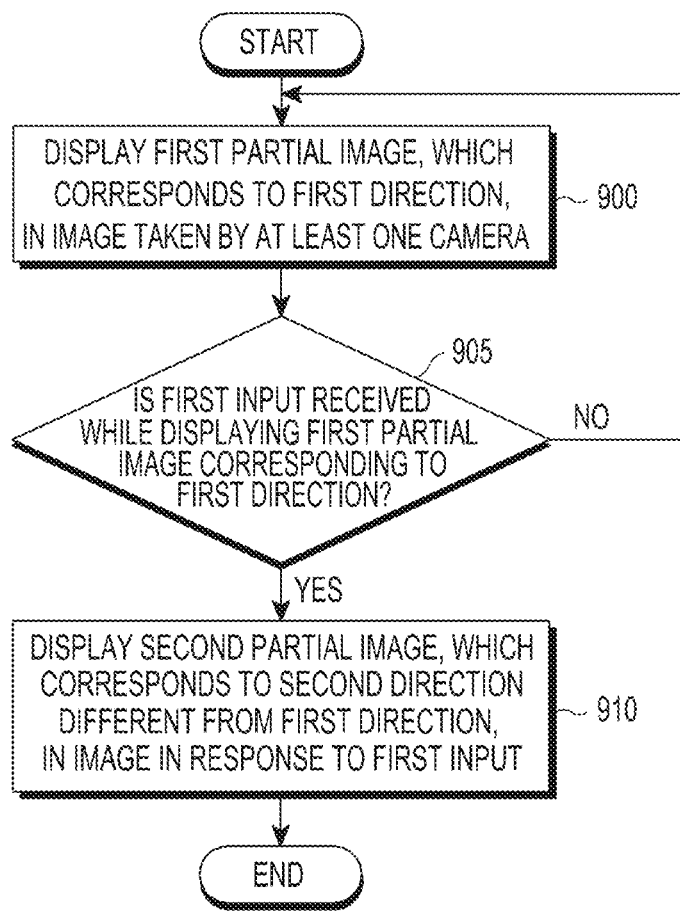
FIG. 9A is a flowchart illustrating an image display method of an electronic device according to an embodiment of the present disclosure.

FIG. 9A is a flowchart illustrating an image display method of an electronic device according to an embodiment of the present disclosure.

Referring to FIG. 9A, the image display method may include operations 900 to 910. The image display method may be performed by at least one of an electronic device (e.g., the electronic device 101, 102, or 410), a processor (e.g., the processor 120) of an electronic device, and a controller of an electronic device.

In operation 900, the electronic device (e.g., the processor 120) displays a first partial image, which corresponds to a first direction, in an image taken by at least one camera on a display (e.g., the display 160 or 560). The image may be a 360-degree image. The first direction may be a reference direction in which a main camera provided in a photographing apparatus taking the 360-degree image is pointed straight ahead.

For example, when the 360-degree image is mapped to a 3D space (i.e., a three-dimensional space), the electronic device (e.g., the processor 120) may display a first area (or a first image corresponding to the first area) of the 3D space according to a first rendering method (e.g., 3D rendering).

In operation 905, the electronic device may determine whether a first input is received while displaying the first partial image corresponding to the first direction. The first input may be a user input for viewpoint change. When the first input is received, the electronic device may display a second partial image, which corresponds to a second direction different from the first direction, in the image in response to the first input in operation 910. The first partial image may correspond to a first portion of each frame of the taken image, and the second partial image may correspond to a second portion of each frame. The second direction is a direction corresponding to a changed viewpoint, which may be a moving direction of the photographing apparatus, determined using sensing information associated with the image. For example, the second direction may correspond to the user's gaze direction and may correspond to the moving direction of an HMD device worn on the user's head.

According to one embodiment, the sensing information associated with the image may include at least one of the position of the photographing apparatus, the direction of the photographing apparatus, and movement information on the photographing apparatus. The sensing information associated with the image may be stored by any one method among a method in which sensing information on capture of each frame of the image is associated with each frame and a method in which the sensing information is included in metadata on the image along with identification information on each frame.

According to one embodiment, the image display method may further include detecting a movement of the electronic device while displaying the first partial image; and displaying a third partial image, which corresponds to the first direction and is based on the movement of the electronic device, in the image when the movement of the electronic device is detected.

According to one embodiment, the image display method may further include detecting a movement of the electronic device while displaying the second partial image; and displaying a fourth partial image, which corresponds to the second direction and is based on the movement of the electronic device, in the image when the movement of the electronic device is detected.

According to one embodiment, the image display method may further include detecting whether an event occurs based on at least one of the sensing information associated with the image and information on a comparison between frames of the taken image when playing the image; and displaying a fifth partial image, which corresponds to a direction of the occurring event, in the image.

Figure 9B:
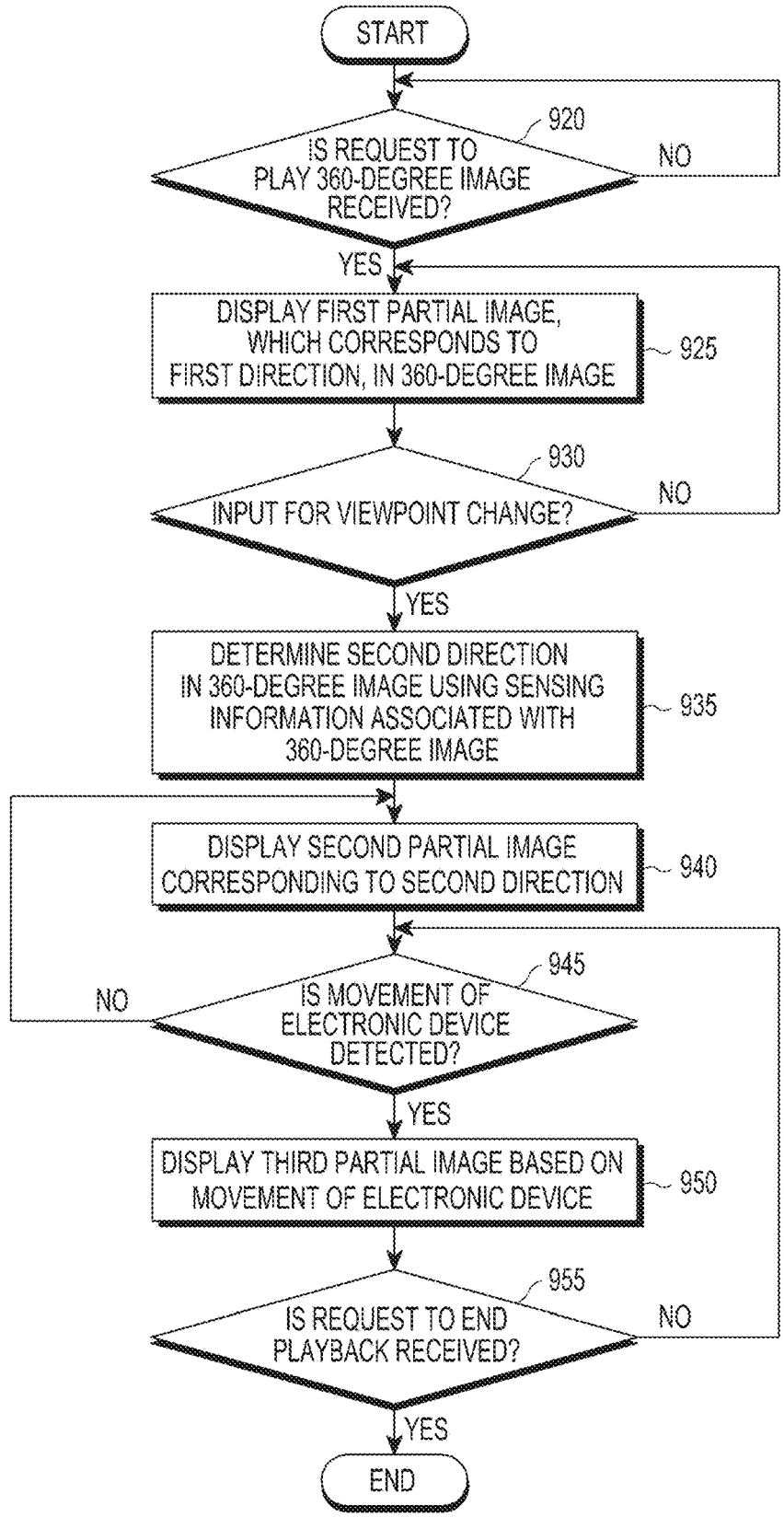
FIG. 9B is a detailed flowchart illustrating an image display method of an electronic device according to an embodiment of the present disclosure.

FIG. 9B is a detailed flowchart illustrating an image display method of an electronic device according to an embodiment of the present disclosure.

Referring to FIG. 9B, the image display method may include operations 920 to 955. The image display method may be performed by at least one of an electronic device (e.g., the electronic device 101, 102, or 410), a processor (e.g., the processor 120) of an electronic device, or a controller of an electronic device.

When a request to play a 360-degree image is made in operation 920, the electronic device (e.g., the processor 120) may display a first partial image, which corresponds to a first direction, in the 360-degree image in operation 925. The first direction may be a reference direction in which a main camera taking the 360-degree image is pointed straight ahead.

For example, when the 360-degree image is mapped to a 3D space, the electronic device may display a first area (or a first image corresponding to the first area) of the 3D space according to a first rendering method.

The electronic device may display a virtual-reality screen or a screen of 3D content on a display (e.g., the display 160). For example, a 3D rendering method may refer to a rendering method requiring 3D graphic-related processes/operations/calculations, such as the use of a 3D graphic library, coordinates/data conversion between 2D coordinate system/data and 3D coordinate system/data, and mapping of data to a 3D space or 3D model. For comparison, a 2D rendering method may refer to a rendering method that requires no 3D graphic-related processes/operations/calculations.

According to one embodiment, the 3D space may be a 3D virtual space that surrounds a photographing apparatus 400 or a photographer through 360 degrees.

According to one embodiment, the 3D space may be generated based on a wide-angle image/video. For example, the wide-angle image/video may include at least one of a 360-degree image/video or 360-degree panoramic image/video, a 2D (i.e., two-dimensional) panoramic image, and the like.

According to one embodiment, the 3D space may be realized by performing texture mapping of a wide-angle image/video to a preset 3D model (e.g., a sphere, a cube, or a cylinder) and by disposing a virtual camera corresponding to a user viewpoint (e.g., a view port) at a position in the 3D model.

In operation 930, the electronic device may determine whether there is an input for viewpoint change. When there is an input for viewpoint change, the electronic device may determine a second direction in the 360-degree image using sensing information associated with the 360-degree image in operation 935. The input for viewpoint change may be an input for changing from the reference direction of the main camera to another viewpoint, such as a viewpoint for selecting one of a viewpoint based on a main traveling direction in which the photographer moves, a viewpoint based on an event, a viewpoint based on a peculiarity of the image, and a viewpoint based on the viewpoint of an external viewer.

FIG. 9B illustrates an input for changing a viewpoint to the moving direction of the photographer as the input for viewpoint change. The second direction may be a moving direction of the photographing apparatus, determined using the sensing information associated with the 360-degree image. According to one embodiment, the sensing information associated with the image may include at least one of the position of the photographing apparatus, the direction of the photographing apparatus, and motion (or movement) information on the photographing apparatus.

In operation 940, the electronic device may display a second partial image corresponding to the second direction. The second direction may be a direction different from the first direction. When the first partial image corresponds to a first portion of each frame of the taken image, the second partial image may correspond to a second portion of the frame.

In operation 945, the electronic device may determine whether a movement of the electronic device (e.g., the electronic device 101, 102, or 410) is detected. When a movement of the electronic device is detected, the electronic device may display a third partial image based on the movement of the electronic device in operation 950. For example, when the electronic device is an HMD device (e.g., the electronic device 410), the electronic device may render a partial image corresponding to the direction resulting from an angular change corresponding to the movement of the electronic device/user when the movement is detected.

According to one embodiment, the electronic device may perform operation 930 or operation 945 between operation 920 and operation 925, the order of operations not being limited thereto. For example, the electronic device may perform operation 945 to determine whether movement of the electronic device is detected while displaying the first partial image corresponding to the first direction in operation 925 or before displaying the first partial image corresponding to the first direction in operation 925. Further, the electronic device may determine whether a movement of the electronic device is detected in operation 945 after determining the second direction using the sensing information in operation 935 and before displaying the image corresponding to the second direction.

For example, when a movement of the electronic device is detected in operation 945 with the electronic device worn on the user's face while displaying the first partial image in operation 925, a third partial image based on the movement of the electronic device in the 360-degree image may be displayed. The third partial image may be a fourth partial image corresponding to the first direction. In addition, when a movement of the electronic device is detected in operation 945 while displaying the second partial image in operation 940, a third partial image based on the movement of the electronic device may be displayed. The third partial image may be a fifth partial image, which corresponds to the second direction, in the 360-degree image. The fourth partial image is an image of a portion different from the first partial image, and the fifth partial image is an image of a portion different from the second partial image.

The electronic device may determine whether there is a request to end playback in operation 955, and may go back to operation 945 to repeat the foregoing operations when no request to end playback is input.

The electronic device may detect whether an event occurs based on at least one of the sensing information associated with the image and information on a comparison between frames of the taken image when playing the image, and may display a fifth partial image in the image, which corresponds to the direction of the occurring event. When an event occurs, the electronic device may display the occurrence of the event on the display so that the user may select an input for viewpoint change.

According to one embodiment, when an event occurs, the electronic device may display a partial image in the 360-degree image, which corresponds to the direction of the occurring event, based on the event. For example, when a collision event occurs, the electronic device may display an image of an area corresponding to the direction of the occurring collision event. In addition, when an audio input occurs, the electronic device may determine the directionality of the audio and may render the field of a corresponding view in the 360-degree image based on the direction of the occurring audio (e.g., the direction of the occurring audio detected by a microphone mounted on the photographing apparatus) to display an image of the field of the view.

Figure 10A:
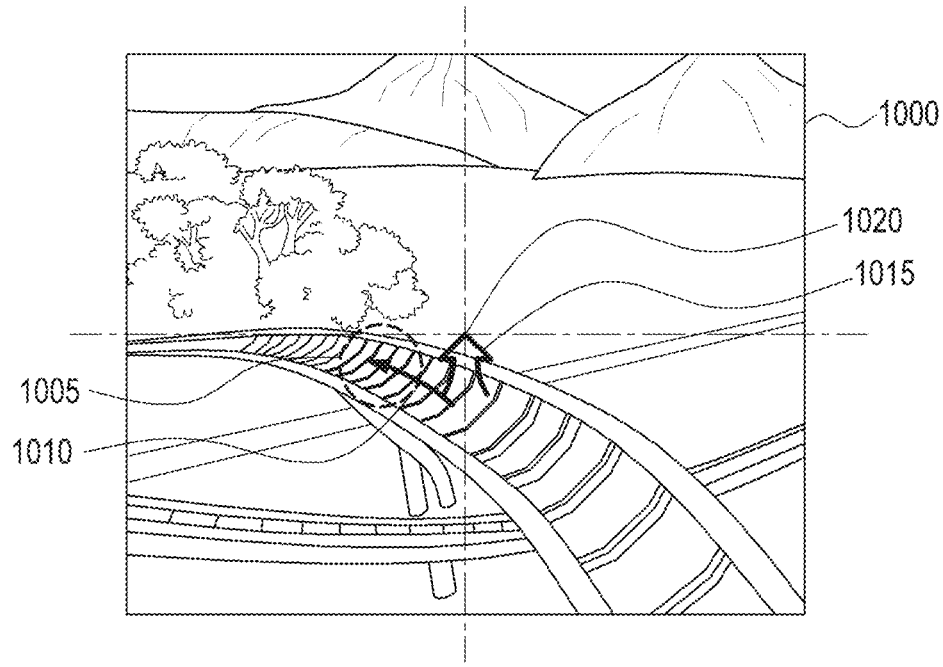
FIGS. 10A and 10B illustrate images according to a plurality of gaze directions in which a 360-degree image is viewed from different positions according to various embodiments of the present disclosure.
Figure 10B:
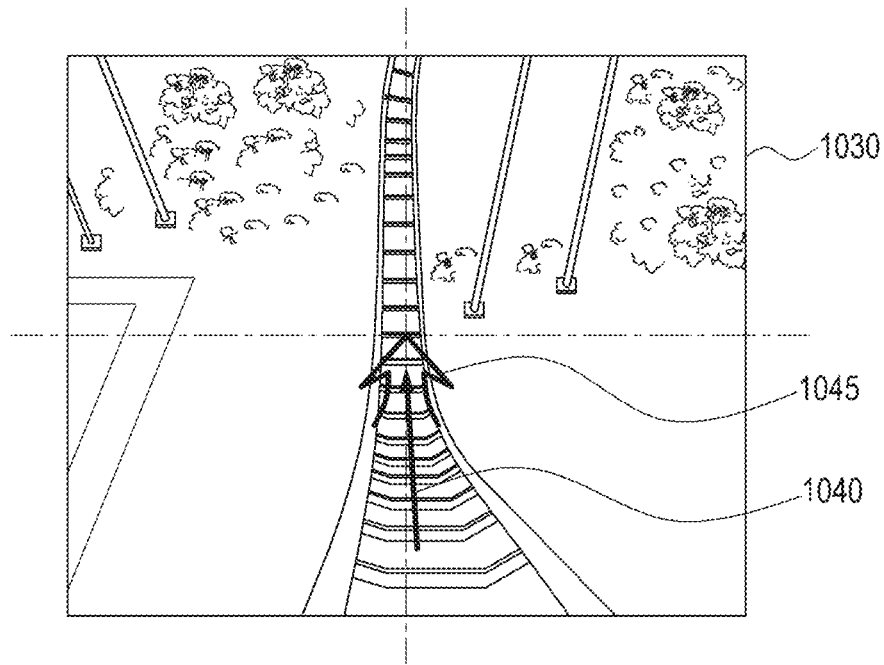

FIGS. 10A and 10B illustrate images according to a plurality of gaze directions in which a 360-degree image is viewed from different positions according to various embodiments of the present disclosure.

Referring to FIG. 10A, when the 360-degree image 1000 is played in an HMD device, the image may be played in accordance with an initial reference point 1020 (e.g., the center of a screen) of the HMD device, which may be defined as an HMD gaze direction. The image may be displayed with the initial reference point 1020 of the HMD device adapted to the gaze direction 1015 of a main camera of the taken image. From the viewpoint of the user wearing the HMD device, the image is seen according to an HMD view change of the viewer based on the gaze direction 1015 of the main camera. There may be a viewpoint from which the direction of movement 1010 of the photographer matches the gaze direction 1020 of the HMD device to main content 1005 on the screen. For example, FIG. 10A illustrates rails of a roller coaster as the main content 1005 on the screen. However, main content may be found automatically by selecting a moving object extracted through comparisons between sequential image frames, a peculiarity of the background, or an object at the most noticeable point, or may be determined by the user directly selecting an object, without limiting the method for determining main content thereto.

FIG. 10B illustrates a 360-degree image 1030 according to a gaze change. When the user inputs a selection for gaze change, the electronic device needs to compute an angle corresponding to a moving direction 1040, in which the photographer travels, in a view corresponding to the reference direction of the main camera, and needs to move the center point of the view by the computed angle in order to display a partial image corresponding to the moving direction. To this end, the electronic device may adjust a partial area corresponding to the reference direction of the main camera in the moving direction, and may compute a final angle using a method of reflecting a value of a gaze direction 1045 of the HMD device, thereby displaying a partial image in a direction corresponding to the final angle.

For example, defining a viewpoint based on the movement of the main camera as a first-person viewpoint, the viewer wearing the HMD device can see an image displaying a scene of a front view on the roller coaster on the basis of the first-person viewpoint, while the viewer can see an image displaying a scene focusing on a bottom portion of the roller coaster or the rails on the basis of a viewpoint based on the traveling direction. In addition, when the viewer wearing the HMD device selects the viewpoint of an external viewer while watching an image displaying a scene of a front view on the roller coaster, the viewer can see an image displaying a scene of a view seen through an HMD device worn by the external viewer. While the same image is played, the viewer and the external viewer are seeing different portions from different angles, in which case the viewpoint of the external viewer may be regarded as a third-person viewpoint.

Figure 11A:
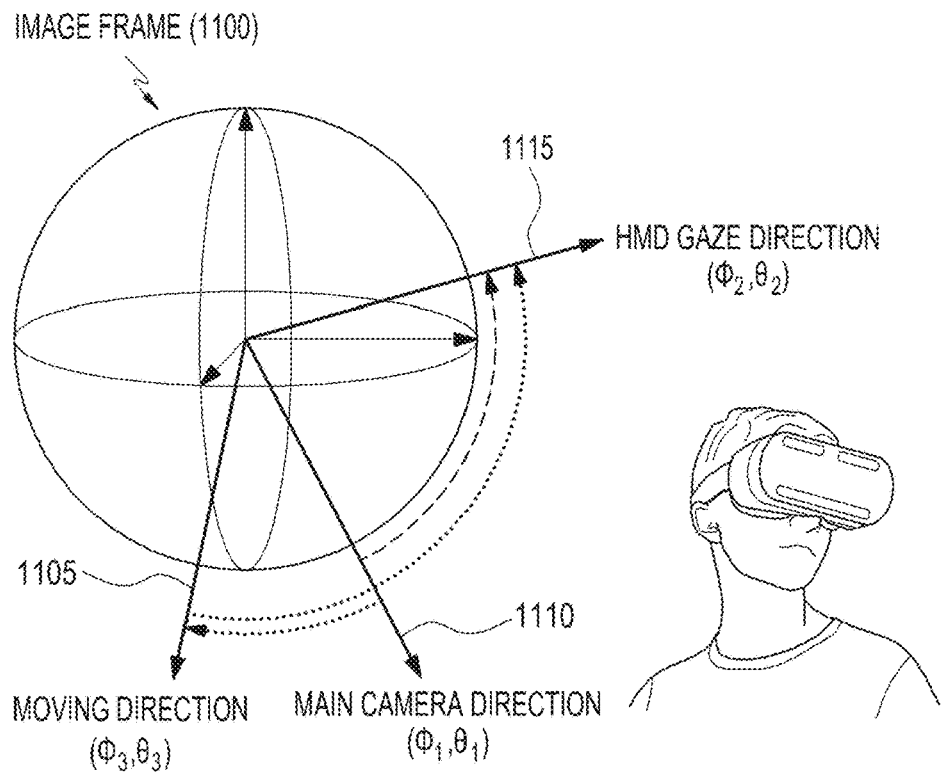
FIG. 11A illustrates a camera direction, a moving direction, and an HMD gaze direction in a 3D space according to an embodiment of the present disclosure.

FIG. 11A illustrates a camera direction, a moving direction, and an HMD gaze direction in a 3D space according to an embodiment of the present disclosure.

Referring to FIG. 11A, when an image frame 1100 is mapped to a 3D spherical space, a moving direction 1105, a main camera direction 1110, and an HMD gaze direction 1115 may be different from each other. For example, when an electronic device plays an image, if the electronic device is an HMD device, the electronic device may display a partial image according to the angle of the HMD device, that is, the angle of the HMD gaze direction, relative to the direction 1110 of a main camera of a photographing apparatus. When the electronic device plays an image from the viewpoint of a photographer (i.e., based on the main camera direction 1110), defining the angle of the main camera direction 1110 as $(\Phi_1, \theta_1)$, the electronic device may display a partial image according to the angle $(\Phi_2, \theta_2)$ of the HMD gaze direction relative to the angle $(\Phi_1, \theta_1)$ of the main camera direction 1110.

However, when the electronic device plays an image in a main traveling direction (i.e., a moving direction), in which the photographer travels, the electronic device may display a partial image according to an angle resulting from the change attributable both to the angle of the moving direction relative to the angle of the main camera direction 1110 and to the angle $(\Phi_2, \theta_2)$ of the HMD gaze direction. The electronic device may display a partial image according to the angle of the moving direction of the photographer, which is equal to the angle $(\Phi_1, \theta_1)$ of the main camera direction 1110 minus the angle $(\Phi_3, \theta_3)$ of the moving direction 1105 plus the angle $(\Phi_2, \theta_2)$ of the HMD gaze direction 1115. As described above, when a user selects a viewpoint change to one viewpoint based on the traveling direction while an image is played, an image in a direction viewed with the HMD device based on the traveling direction may be an image corresponding to an angle resulting from the following calculation the angle $(\Phi_1, \theta_1)$ of the main camera direction 1110—the angle $(\Phi_3, \theta_3)$ of the moving direction 1105+the angle $(\Phi_2, \theta_2)$ of the HMD gaze direction 1115.

Figure 11B:
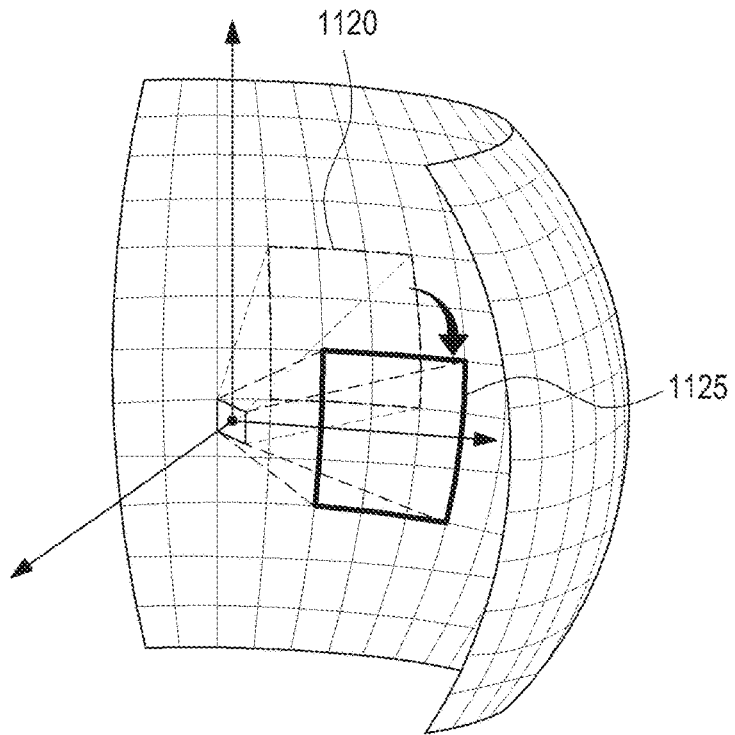
FIG. 11B illustrates a partial image corresponding to a selected gaze direction among a plurality of gaze directions in a 3D space according to an embodiment of the present disclosure.

When the final angle is computed, the electronic device may correct a viewpoint direction in the manner illustrated in FIG. 11B, may determine a portion corresponding to the corrected viewpoint direction, and may render an image of the determined portion.

FIG. 11B illustrates a partial image corresponding to a selected viewpoint direction among a plurality of gaze directions in a 3D space according to an embodiment of the present disclosure.

Referring to FIG. 11B, when an input for viewpoint change is received from a user while rendering and displaying an image of a portion 1120 corresponding to the reference direction of the main camera, the electronic device may determine the moving direction of the photographing apparatus based on sensing information and may render and display an image of a portion 1125 corresponding to the determined moving direction. When the electronic device is moving, the electronic device may move a current display direction by an angle corresponding to the movement, and may display an image of a portion corresponding to the direction moved at the angle.

Figure 12:
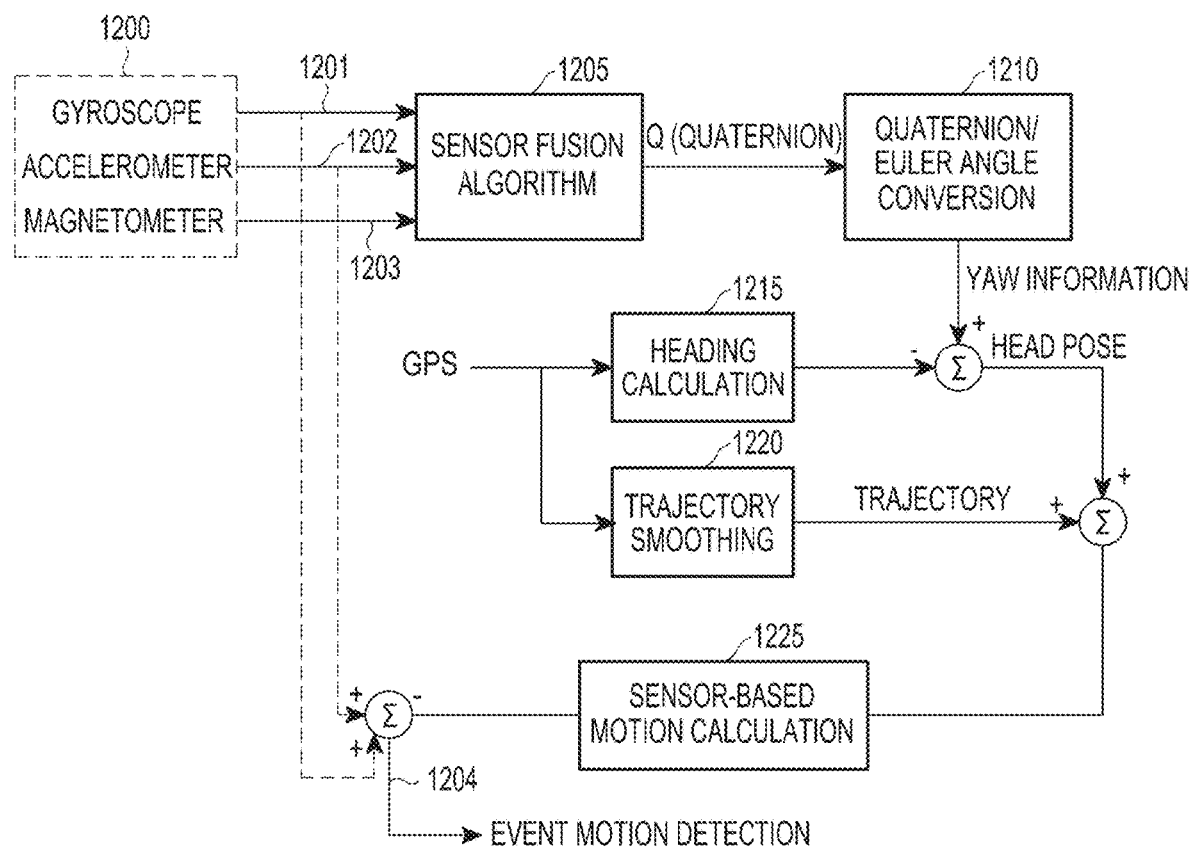
FIG. 12 illustrates a process for computing direction information based on sensing information according to an embodiment of the present disclosure.

FIG. 12 illustrates a process for computing direction information based on sensing information according to various embodiments of the present disclosure, and FIGS. 13A to 13D illustrate the process of FIG. 12 in detail.

Referring to FIG. 12, an operation of computing direction information, such as a camera (or photographing apparatus) direction and a moving direction, may be performed by any one of a photographing apparatus, an external server, an external device, and an image playback apparatus.

An electronic device may compute direction information through a sensor fusion algorithm 1205 using sensor values 1201, 1202, and 1203 output from a sensor 1200, such as a gyroscope, an accelerometer, and a magnetometer. A detailed operation of the sensor fusion algorithm 1205 is illustrated in FIG. 13A.

Figure 13A:
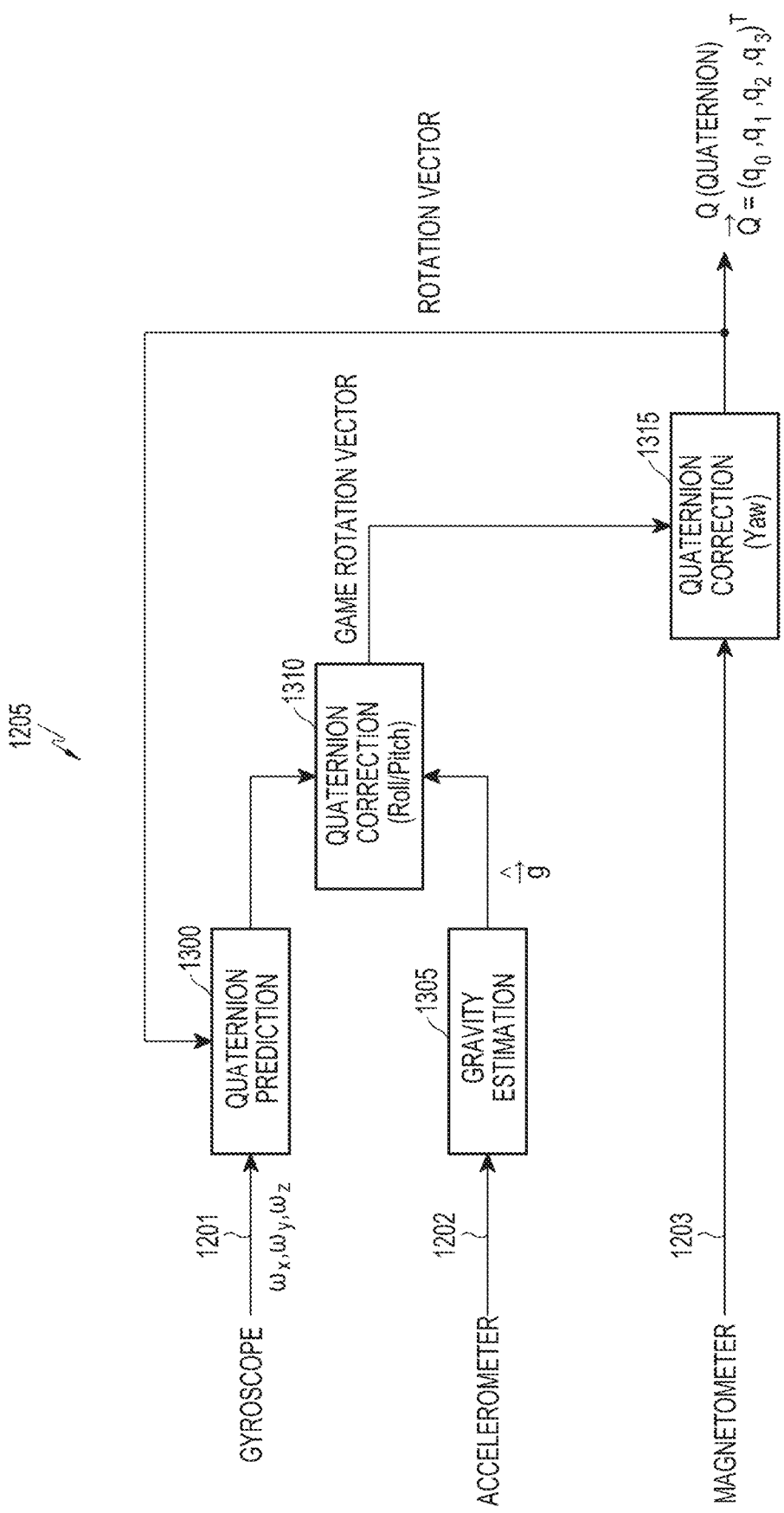
FIGS. 13A, 13B, 13C, and 13D illustrate the process of FIG. 12 in detail according to various embodiments of the present disclosure.

Referring to FIG. 13A, a gyroscope may output a sensor value 1201 obtained by measuring rotational angular speed with respect to Earth inertial coordinates of three x, y, and z axes of moving object (e.g., camera or photographing apparatus) coordinates. The rotational angular speed of the moving object represents the pose of the camera (or photographing apparatus), and may be regarded as the viewpoint of the photographing apparatus. For example, the sensor fusion algorithm 1205 may receive, from the gyroscope, a value ($\omega_x$, $\omega_y$, $\omega_z$) 1201 to which the rotational angular speed of the camera measured using the gyroscope is converted on the coordinate system.

The sensor fusion algorithm 1205 may receive, from an accelerometer, a sensor value 1202 obtained by measuring acceleration with respect to Earth inertial coordinates of three x, y, and z axes of moving object (e.g., camera or photographing apparatus) coordinates. The sensor fusion algorithm 1205 may receive, from a magnetometer, a sensor value 1203 obtained by measuring the direction of a magnetic north point on the three x, y, and z axes of the camera coordinates.

The sensor value ($\omega_x$, $\omega_y$, $\omega_z$) 1201 from the gyroscope may be used to compute an estimated quaternion value as a quaternion representing a pose of a moving object (e.g., camera or photographing apparatus) through quaternion prediction 1300. Earth gravitational acceleration ($\vec{g}$) in a coordinate system with respect to the measured value from the accelerometer may be computed using a low-pass filter through gravity estimation 1305. The estimated value of the quaternion computed through quaternion prediction 1300 and the gravitational acceleration computed through gravity estimation 1305 may be used to correct roll and pitch angles by comparing gravity on a reference coordinate system with actual gravity (0,0, −g) through quaternion correction 1310. The corrected roll and pitch angles may be referred to a game rotation vector. The measured value from the magnetometer and the game rotation vector may be used to correct a yaw angle by predicting Earth's magnetic field in the reference coordinate system and comparing the predicted Earth's magnetic field with an actual magnetic field (M, 0, 0) in the reference coordinate system through additional quaternion correction 1315.

As described above, according to the sensor fusion algorithm 1205, correction for eliminating error included in the roll and pitch calculated using the measured value from the gyroscope may be performed using the measured value from the accelerometer and correction for eliminating error in the measured value from the gyroscope may be performed using the yaw measured by the magnetometer, thereby computing a quaternion value as a quaternion representing a pose of the moving object (for example, a camera). The quaternion value may be represented by Equation 1.

$$\overline{Q} = (q_0 \; q_1 \; q_2 \; q_3)^T \quad \text{Equation 1}$$

A rotation vector of a corrected quaternion may be used for subsequent quaternion prediction 1300. For example, when a current quaternion value computed through the sensor fusion algorithm 1205 is a kth quaternion value, the rotation vector may be used to compute a (k+1)th quaternion value.

As illustrated in FIG. 12, a quaternion (Q) value corrected through the sensor fusion algorithm 1205 may be output as yaw information through quaternion/Euler angle conversion 1210, which is described in detail with reference to FIG. 13B.

Figure 13B:

As illustrated in FIG. 13B, a quaternion value may be used to compute Euler angles ($\Phi$, $\theta$, $\psi$), corresponding to roll, pitch, and yaw angles, through quaternion/Euler angle conversion 1210. $q_1$, $q_2$, and $q_3$ indirectly have roll, pitch, and yaw information, respectively, and thus may be used to compute the roll, pitch, and yaw angles. The Euler angles may represent a triaxial pose of the moving object in a reference navigation coordinate system.

GPS signals received from a GPS receiver in FIG. 12 may be used in heading calculation 1215 and trajectory smoothing 1220. The GPS signals may be used to calculate a translational motion, that is, the latitude, longitude, altitude, latitudinal speed, longitudinal speed, and altitudinal speed, of the photographing apparatus. When either of upward and downward movement is detected, the GPS signals may be replaced with sensing information measured by an altitude sensor.

Figure 13C:
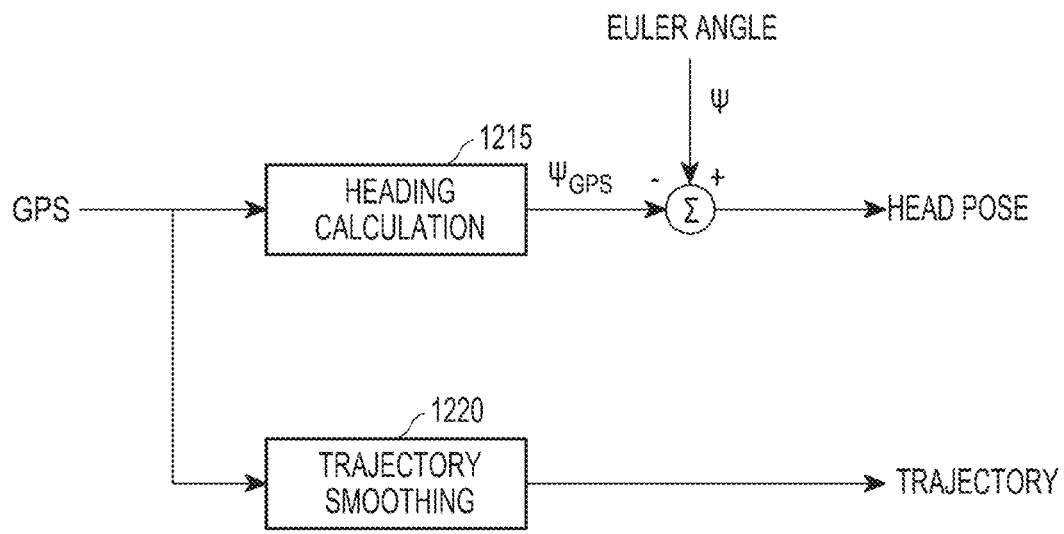

Referring to FIG. 13C to describe heading calculation 1215 and trajectory smoothing 1220, on the assumption that a photographer facing the photographing apparatus is currently facing forwards, the current movement direction ($\psi_{GPS}$) of the photographer (the direction that the center of the body of the photographer faces) is calculated from a positional change based on a received GPS signal, after which the moving direction ($\psi_{GPS}$) of the photographer is subtracted from a yaw direction ($\psi$) of the Euler angles, thereby obtaining a head direction of the photographer, that is, a head pose. Since the measured GPS values include random noise, the trajectory of the moving photographer may be corrected in order to continue using a trajectory-smoothing scheme.

The head pose calculated by heading calculation 1215 and the trajectory corrected by trajectory smoothing 1220 may be used to detect an event motion 1204 among pieces of motion information calculated through sensor-based motion calculation 1225.

Figure 13D:
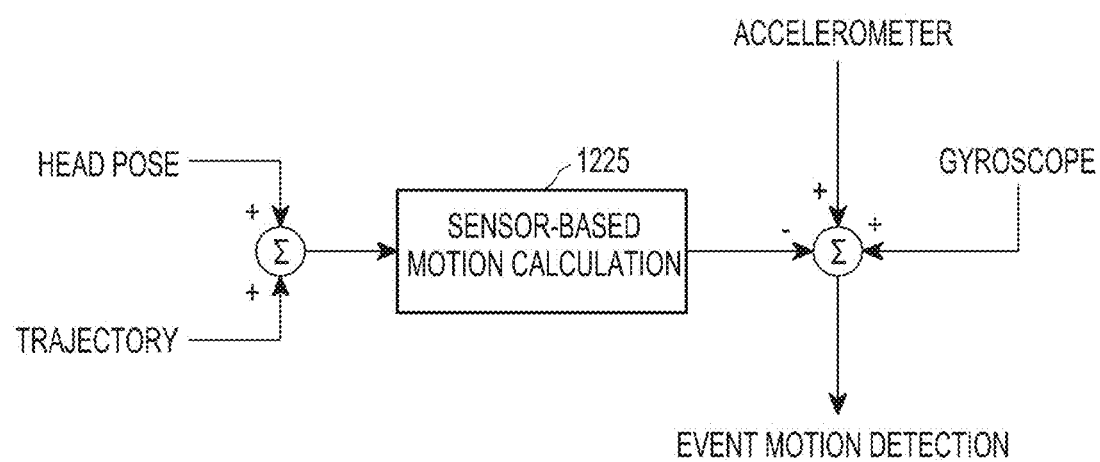

Referring to FIG. 13D to describe an operation of detecting an event motion, an inertial measurement unit (IMU) attached to the head of the photographer may calculate estimated acceleration by merging the head pose calculated by heading calculation 1215 and the trajectory corrected by trajectory smoothing 1220.

The head pose calculated by heading calculation 1215 and the trajectory corrected by trajectory smoothing 1220 may be values estimated by the accelerometer and the gyroscope. By respectively subtracting the estimated values by the accelerometer and the gyroscope from measured values which are actually measured in real time by the accelerometer and the gyroscope, an event motion, such as a jump or a sharp turn, may be detected. For example, when differences between the values measured by the two sensors and the values estimated by the two sensors are within a threshold range, it may be considered that the photographer is moving according to an estimated trajectory, facing forwards. However, when the differences between the values measured by the two sensors and the values estimated by the two sensors are out of the threshold range, a movement deviating from the estimated trajectory, for example, an event motion including a jump, a sharp turn, a steep descent, a steep ascent or the like, may be detected while the photographer is moving.

Figure 14:
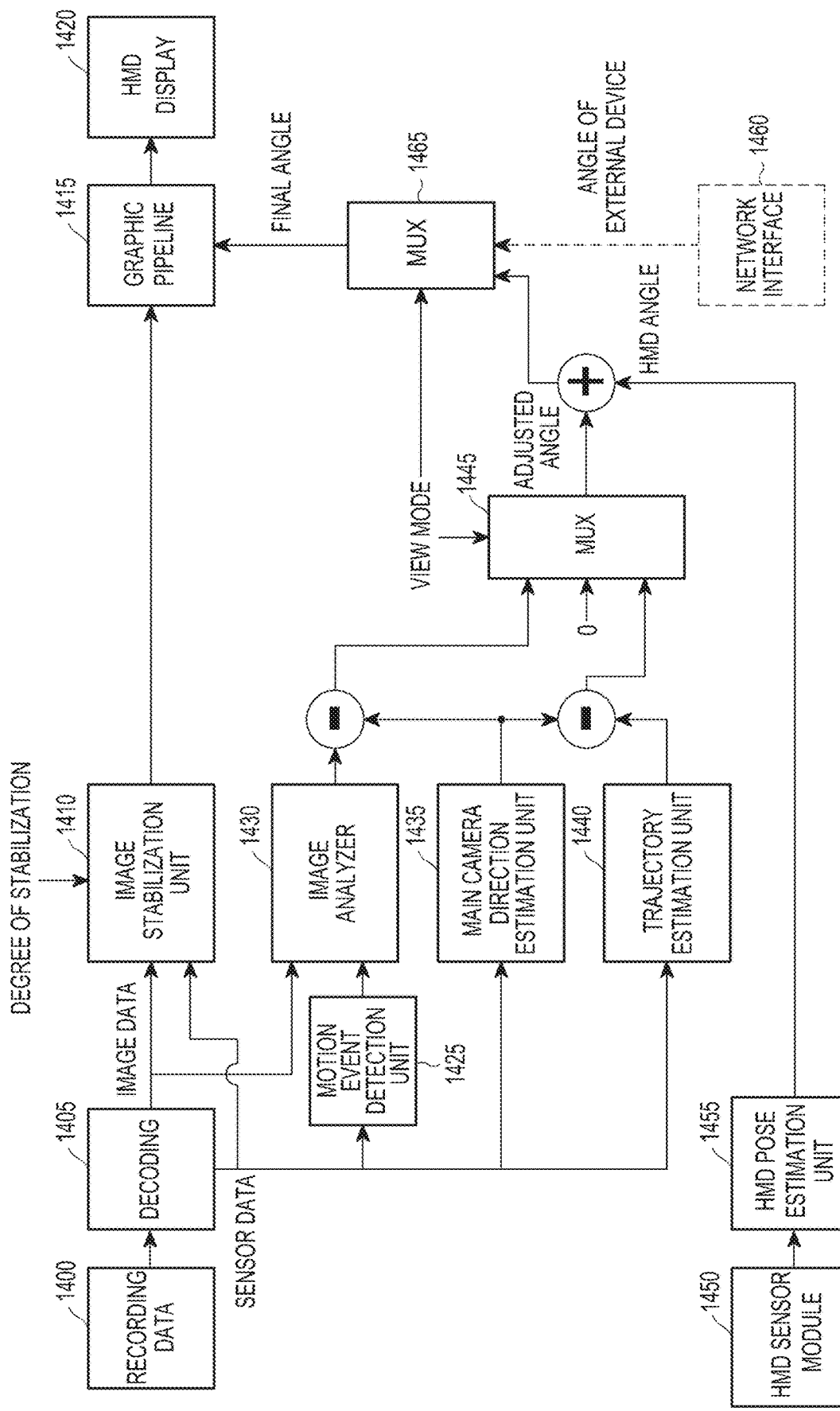
FIG. 14 is a block diagram illustrating an image playback process according to an embodiment of the present disclosure.

FIG. 14 is a block diagram illustrating an image playback process according to an embodiment of the present disclosure.

Referring to FIG. 14, the image playback apparatuses 101 and 102 may separate recording data 1400, received from the photographing apparatus, into image data and sensor data through decoding 1405. The recording data 1400 has the form of each image frame combined with sensing information and may represent sensor data including a sensing value sensed in image capture and encoded image data.

The image data may be transmitted to an image stabilization unit 1410 and may undergo image stabilization, and the stabilized image data may be transmitted to a graphic pipeline 1415. The sensor data may be transmitted to the image stabilization unit 1410 so as to be used for adjusting vibration of the image, may be transmitted to a motion event detection unit 1425 for event detection, or may be transmitted to a main camera direction estimation unit 1435 and a trajectory estimation unit 1440 to estimate the direction of a main camera and a traveling direction.

The motion event detection unit 1425 may detect an event using sensor data associated with an image. For example, when a sensing value is detected to be out of a threshold range based on sensing data, the motion event detection unit 1425 may determine that an event, such as a jump, a sharp turn, a steep descent, or a steep ascent, has occurred. It is also possible to determine the occurrence of an event based on image data in addition to sensor data. To this end, an image analyzer 1430 may determine the occurrence of an event by comparing image frames. When a sudden change is detected, for example, when a peculiarity disappears or another peculiarity appears, while analyzing the image frames, for example, matching feature points of neighboring image frames, the image analyzer 1430 may determine that an event has occurred. Further, when the motion event detection unit 1425 detects that an event has occurred, the image analyzer 1430 may calculate an angle based on an image frame corresponding to the time at which the event occurred.

When an input for viewpoint change is received from a user, for example, when a viewpoint change is requested to change from playback based on the direction of the main camera (i.e., the viewpoint of a photographer), to playback based on a main traveling direction in which the photographer is moving, a first multiplexer (MUX) 1445 may calculate an angle equal to an angle in the gaze direction of the main camera minus an angle in the traveling direction.

When the motion event detection unit 1425 or the image analyzer 1430 detects that an event has occurred, an event angle corresponding to an event occurrence direction may be provided to the first MUX 1445. Accordingly, when an event occurs, the first MUX 1445 may calculate an adjusted angle equal to an angle in the gaze direction of the main camera minus an angle in an event occurrence direction.

When an image is played in an HMD device, an HMD pose estimation unit 1455 may output an HMD angle according to an HMD posture based on sensor data from an HMD sensor module 1450 of the HMD device. A second MUX 1465 may calculate a final angle equal to the HMD angle plus an adjusted angle. The final angle may be transmitted to the graphic pipeline 1415. When a partial image corresponding to the direction of the final angle is rendered in image rendering, the rendered partial image corresponding to the direction of the final angle may be displayed through an HMD display 1420. Since a partial image in a direction corresponding to a selected viewpoint in a 360-degree image is displayed, it is possible to see an image corresponding to the direction in which the user wearing the HMD device is looking.

When an image is played based on the viewpoint of an external viewer wearing another HMD device, it is possible to play an image reflecting the angle of the external device (i.e., another HMD device), via a network interface 1460. Accordingly, even though the same 360-degree image is played, users wearing separate HMD devices may see images of different portions (or different interest areas) according to the gaze direction in which each of the users is looking.

The operation of the image stabilization unit 1410 of FIG. 14 is described in detail with reference to FIGS. 15A to 15C.

Figure 15A:
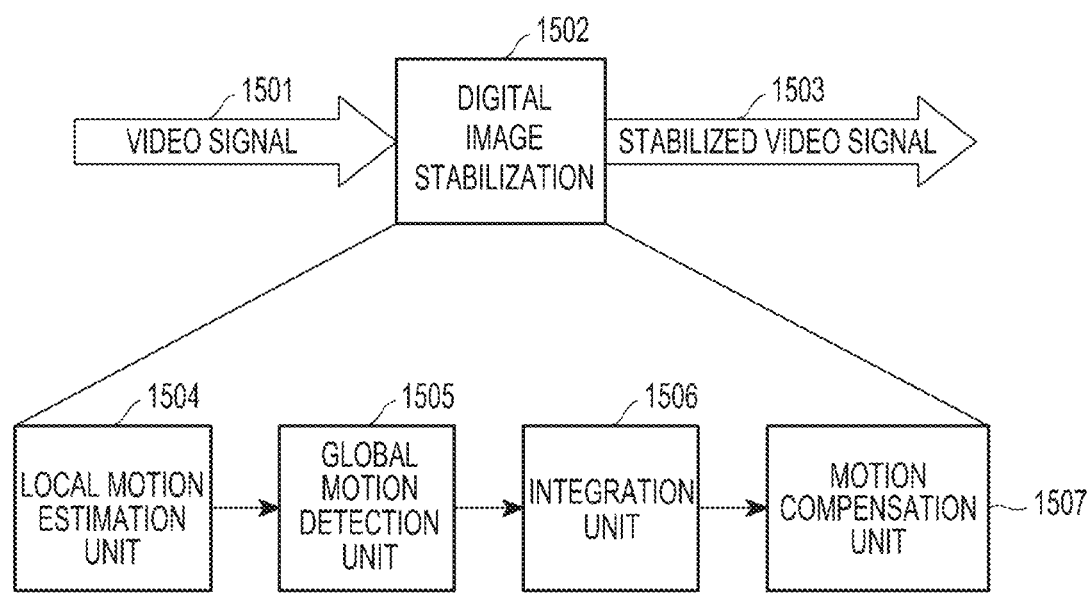
FIGS. 15A, 15B, and 15C illustrate an image stabilization operation according to various embodiments of the present disclosure.
Figure 15B:
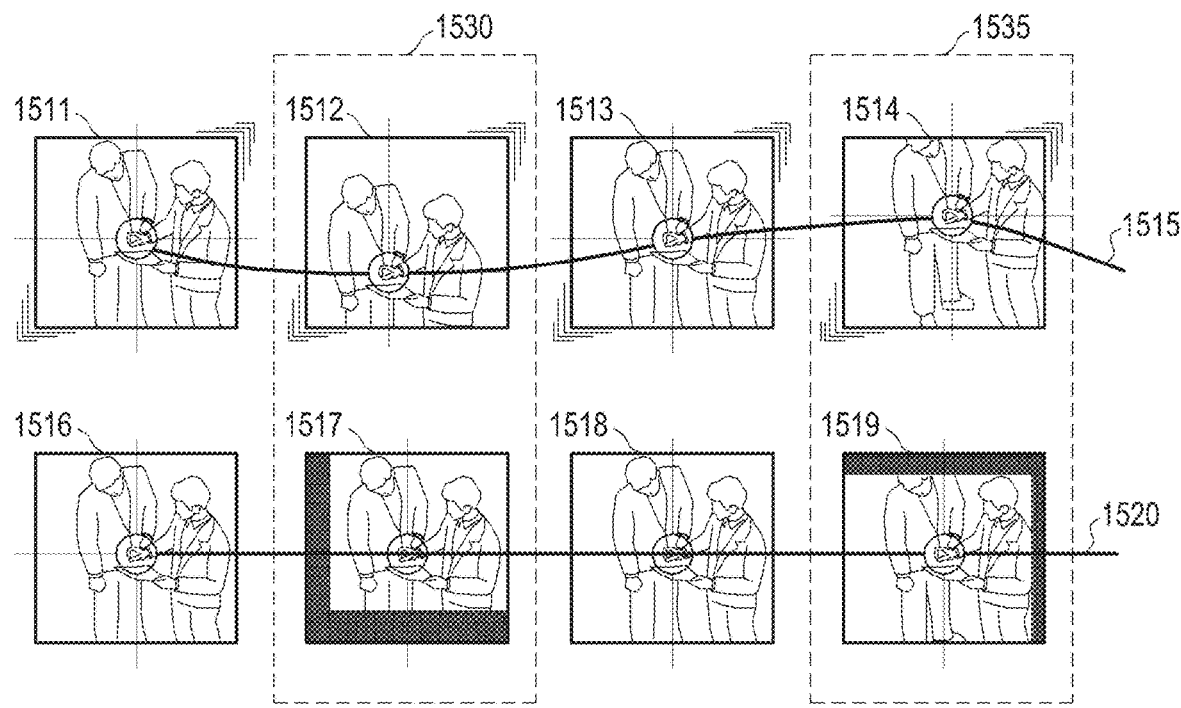
Figure 15C:
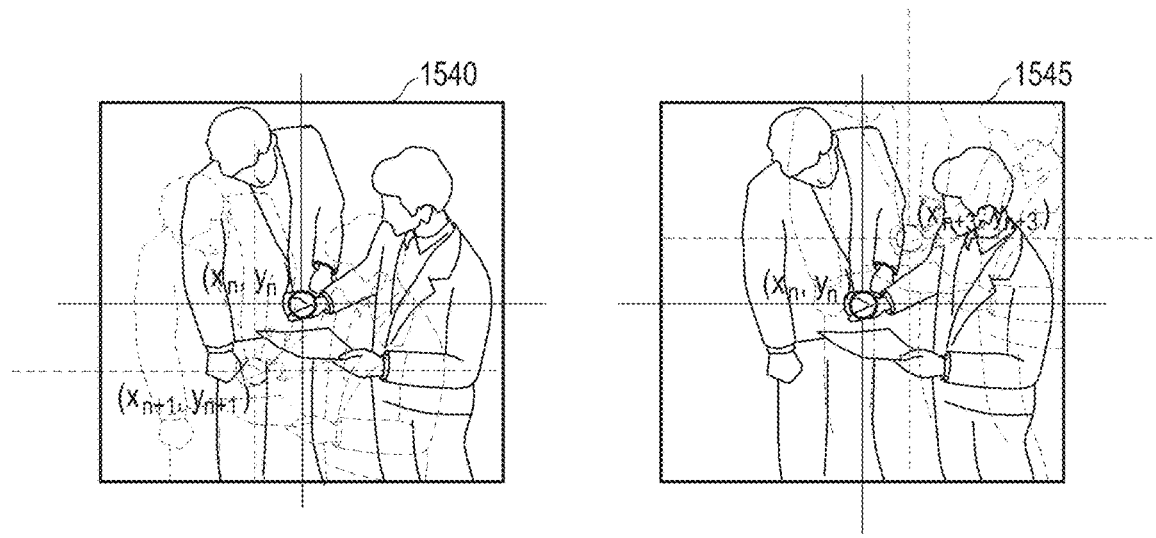

FIGS. 15A, 15B, and 15C illustrate an image stabilization operation according to various embodiments of the present disclosure.

Referring to FIG. 15A, a video signal or image data 1501 may be output as a stabilized video signal 1503 through a digital image stabilization 1502 process. Although FIG. 15A illustrates a local motion estimation unit 1504, a global motion detection unit 1505, an integration unit 1506, and a motion compensation unit 1507 as components for performing a digital image stabilization 1502 operation, the components may not be limited thereto.

Digital image stabilization 1502 is an operation for attenuating the vibration of an image to adjust unintentional blur with image processing. In general image processing, a digital image stabilization operation focuses on correction for eliminating blur from an image. According to various embodiments of the present disclosure, digital image stabilization 1502 may not only correct a blur using sensor data in image processing but may also provide a haptic effect, such as vibration, so that a viewer feels as though he/she were watching a real image. Accordingly, when blur is corrected using an accelerometer value of sensor data, the degree of screen blur (or the degree of stabilization) may be displayed in an adjusted manner, and thus the viewer can enjoy a realistic image.

Referring to FIG. 15B, methods for correcting image blur may be broadly divided into separate image correction methods for user-intended operation and user-unintended operation, in which an image may be corrected corresponding to a distinguished operation. FIG. 15B illustrates a plurality of image frame sequences, among which an unstabilized image frame sequence includes first to fourth images 1511, 1512, 1513 and 1514 and a stabilized image frame sequence includes first to fourth images 1516, 1517, 1518, and 1519. As illustrated in FIG. 15B, when the images are aligned with respect to feature points in two adjacent image frames, a line connecting feature points in unstabilized image frames 1511, 1512, 1513, and 1514 may be a curve 1515, but a line connecting feature points in stabilized image frames 1516, 1517, 1518, and 1519 may be a straight line 1520.

For example, in a comparison 1530 between image frames 1512 and 1517 of FIG. 15B, a feature point of a second video frame 1512 is shifted out of the center to the bottom left compared with that of a first image frame 1511, and a feature point of a fourth image frame 1514 is shifted to the top right compared with that of a third image frame 1513. Thus, correction may be performed to shift the feature point of the second image frame 1512 to the top right, for example, so that the feature point is positioned at the center. Likewise, correction may be performed to shift pixels in the fourth image frame 1514 to the bottom left so that the feature point of the fourth image frame 1514 is positioned at the center.

When image stabilization is performed based on a feature point in each image frame, the feature points may be shifted to the center, thus obtaining the stabilized first to fourth image frames 1516, 1517, 1518, and 1519. For example, in a comparison 1530 between second image frames 1512 and 1517 of FIG. 15B, a second image frame 1517 with a feature point shifted to the top right toward the center may be obtained. In addition, in comparison 1535 between fourth image frames 1514 and 1519, a stabilized fourth image frame 1519 with a feature point positioned the center may be obtained by correction to shift the feature point of the fourth image frame 1514 to the bottom left.

A method for calculating the transformation of image frames in order to align images based on feature points of a previous image frame and a subsequent image frame as described above is referred to as global motion estimation, which is represented by Equation 2.

$$x_{n+m} = \begin{pmatrix} a_1 & a_2 \\ a_3 & a_4 \end{pmatrix} \begin{pmatrix} x \\ y \end{pmatrix} + \begin{pmatrix} b_1 \\ b_2 \end{pmatrix} = A_n^m x_n + b_n^m \quad \text{Equation 2}$$

In Equation 2, a pixel of each image frame may be represented by $\chi=(x, y)$, n may represent a current image frame, and n+m may represent an (n+m)th image frame. Equation 2 may mean that a portion that can be a feature of the (n+m)th image frame is detected from an nth image frame and is converted into an mth pixel.

As shown in FIG. 15B, by aligning the images based on feature points of the unstabilized image frames, that is, the first to fourth image frames 1511, 1512, 1513, and 1514, aligned image frames 1516, 1517, 1518, and 1519 may be obtained. Therefore, an electronic device may display image frames by adjusting differences between the image frames based on feature points of the image frames, thus enabling a user to watch an image without dizziness. As such, images may be displayed to the user without a significant difference between the images. However, when images are displayed to the user as if actually shaking depending on variation in movement of the electronic device, the user may feel physical effects.

According to various embodiments, by taking advantage of the image alignment process, for example, by adjusting the weight for the alignment of image frames, images having differences therebetween may be displayed. When images are displayed by adjusting differences therebetween, the user may feel as though he/she were viewing real images. Differences between images may be referred to as vibrations, and the user may feel a sensation of vibrations when watching images having differences.

For example, when an image is played, vibrations may be provided through the image to provide a feeling of liveliness to a viewer wearing an HMD device. The vibrations through the image are visual vibrations, which may mean screen shaking. When a viewer wants to see extreme sports realistically, image vibrations may be a major factor in maximizing a feeling of liveliness. To this end, a vibration effect using an image may be provided for the user during image playback. The vibration effect may be obtained by Equation 3.

$$x_{n+m} = aA_n^m x_n + b_n^m \quad \text{Equation 3}$$

Equation 3 shows the case where a weight a representing a vibration effect is applied to Equation 2, in which the weight a satisfies $0 \leq a \leq 1$. Various modes of vibration effects may be provided for a viewer by adjusting the weight a in Equation 3. The weighting value a=0 may represent the case where vibrations based on information on a photographing state is applied; a=1 may represent the case where vibrations are maximally removed; and 0<a<1 may represent the case where a vibration level is adjusted by applying a weight to the converted value of an image.

FIG. 15C illustrates the case 1540 in which an nth image frame and an (n+1)th image frame are overlapped and the case 1545 in which the nth image frame and an (n+3)th image frame are overlapped. In the first case 1540, when the coordinates of a pixel in a feature portion of the nth image frame is defined as $(x_n, y_n)$, the coordinates of a pixel in a feature portion of the (n+1)th image frame may be defined as $(x_{n+1}, y_{n+1})$. In the second case 1545, when the coordinates of a pixel in a feature portion of the nth image frame are defined as $(x_n, y_n)$, the coordinates of a pixel in a feature portion of the (n+3)th image frame may be defined as $(x_{n+3}, y_{n+3})$.

Correction may be performed such that the two feature portions of the first case 1540 and the second case 1545 (i.e., the different portions), are overlapped (i.e., such that a difference between the portions is 0). For example, when pixels in the (n+3)th image frame are transformed in the same manner as pixel transformation is performed from $(x_{n+3}, y_{n+3})$ as the coordinates of the pixel in the feature portion of the (n+3)th image frame to the pixel $(x_n, y_n)$, the different portions may be corrected. When correction is performed such that the difference between the portions is 0, there is no variation between the two image frames, and thus the user may view an image that does not shake.

When a certain difference is allowed between the coordinates $(x_{n+1}, y_{n+1})$ of the pixel in the feature portion of the (n+1)th image frame and the coordinates $(x_n, y_n)$ of the pixel in the nth image frame, the user may view an actually shaking image. Here, the certain difference may be adjusted using the weight a in Equation 3. For example, when pixels in the nth image frame and the (n+1)th image frame are multiplied by the weight a satisfying 0<a<1, an image having a vibration effect to which the weight a is applied between the nth image frame and the (n+1)th image frame may be played. Further, when pixels in the nth image frame and the (n+3)th image frame are multiplied by the weight a satisfying 0<a<1, an image frame in which pixels are shifted by the weight between $(x_n, y_n)$ and $(x_{n+3}, y_{n+3})$ may be output.

Although a difference between image frames due to shaking has been mentioned as a pixel transformation, a difference (or distance) between image frames due to shaking may also be referred to as an angular change. Thus, a difference (or distance) between image frames representing shaking may be expressed by an angle or coordinates according to a coordination.

FIG. 15C illustrates a method for providing a visual vibration effect by reflecting screen-shaking visual vibrations on each image frame as one method for providing a user with a realistic sensation. However, it is possible to apply various types of haptic effects, such as a tactile effect, to each image frame. For example, impact effects may be transmitted to a user so that the user may actually feel impacts according to impacts in music, a movie or a game or the value of virtual vibrations determined by the user or in a system.

The operation of the graphic pipeline 1415 of FIG. 14 is described in detail with reference to FIG. 16A.

Figure 16A:
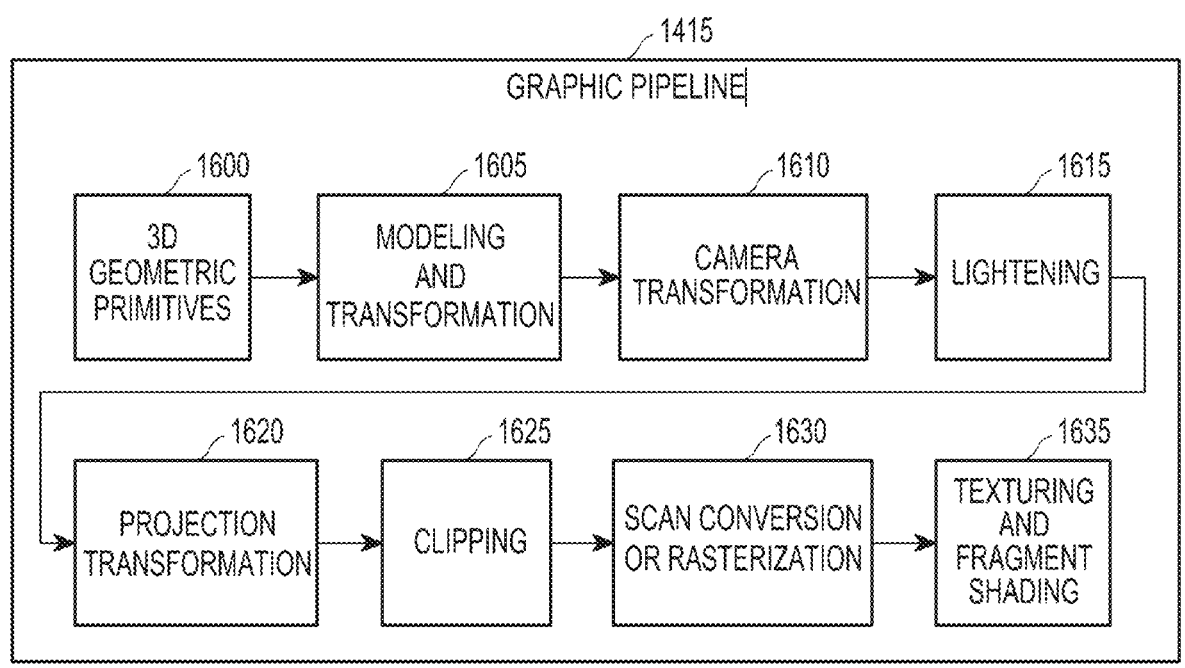
FIG. 16A illustrates a graphic pipeline operation according to an embodiment of the present disclosure.

FIG. 16A illustrates a graphic pipeline operation according to an embodiment of the present disclosure.

Referring to FIG. 16A, the graphic pipeline operation may be performed by at least one of an electronic device (e.g., the electronic device 101, 102, or 410), a processor (e.g., the processor 120) of an electronic device, or a controller of an electronic device. Alternatively, the graphic pipeline operation may be performed by a rendering unit (e.g., the rendering unit 550) of an electronic device.

Referring to FIG. 16A, the operation of the graphic pipeline 1415 may include 3D geometric primitives 1600, modeling and transformation 1605, camera transformation 1610, lightening 1615, projection transformation 1620, clipping 1625, scan conversion or rasterization 1630, and texturing and fragment shading 1635.

A 3D geometric primitives operation 1600 is an operation of creating the shape of a sphere 610, as illustrated in FIG. 6. To create a spherical 3D model 610 as in FIG. 6, a center position and the radius of the sphere need to be determined. According to one embodiment, the center position and the radius may be determined by default. For example, the center position may be determined as (0, 0, 0), and the radius may be determined as 1.

A modeling and transformation operation 1605 is an operation of transforming a 2D plane image (e.g., an omnidirectional captured image) into the spherical 3D model 610 created through the 3D geometric primitives operation 1600.

The 3D geometric primitives operation 1600 and the modeling and transformation operation 1605 are described in detail with reference to FIG. 16B.

Figure 16B:
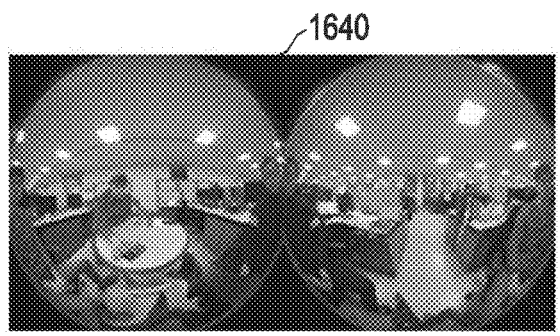
FIG. 16B illustrates a process for rending a two-dimensional (2D) plane fisheye image according to an embodiment of the present disclosure.
Figure 16B:
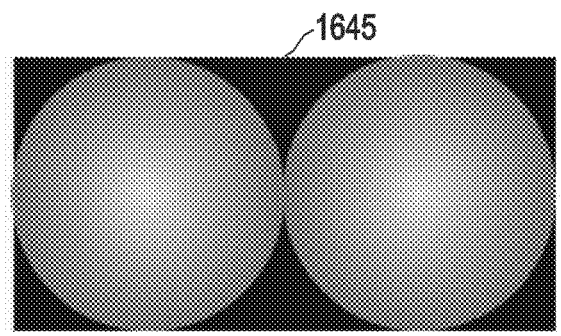
Figure 16B:
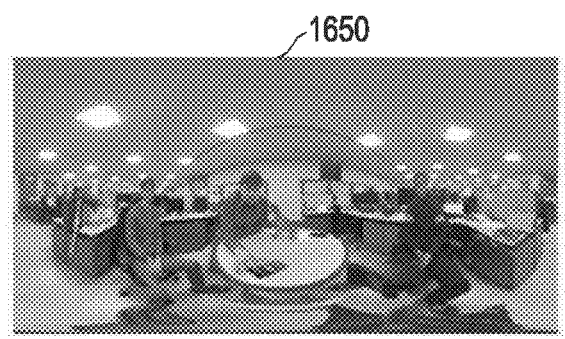
Figure 16B:
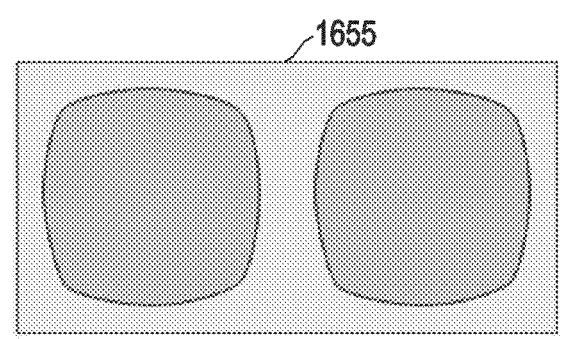

FIG. 16B illustrates a process for rending a 2D plane fisheye image according to various embodiments of the present disclosure.

Referring to FIG. 16, when the photographing apparatus 400 takes an image in all directions using a pair of fisheye lenses, two fisheye images 1645 may be obtained, as illustrated in FIG. 16B. The images are taken using a special lens, such as a fisheye lens, and thus may be distorted as in a pair of actually taken fisheye images 1640. To reproduce the pair of taken fisheye images 1640 as a 3D-space image, the pair of fisheye images 1640 needs to be texture-mapped on the 3D model 610.

To this end, as illustrated in FIG. 16B, each fisheye image is made into a cube or equirectangular form 1655 via warping, seam finding, blending, and the like, after which the two cube or equirectangular images may be merged into a single 2D plane image 1650.

The operation of making a pair of fisheye images 1640 into a 2D plane image 1650 as in FIG. 16B and performing texture-mapping of the 2D plane image 1650 onto the 3D model 610 as in FIG. 6 may be referred to as 3D geometric primitives 1600 and modeling and transformation 1605.

Camera transformation 1610 may refer to an operation of disposing a user viewpoint (or virtual camera) at a position (e.g., the center point 615) in the 3D model and converting a fixed point given as coordinates of the 3D model 610 into those in a camera coordinate system.

Lightening 1615 may be an operation for lighting through mathematical operations, and projection transformation 1620 may be an operation for giving perspective effects.

Clipping 1625 may be an operation of cutting a view region corresponding to a viewpoint as illustrated in FIG. 11B.

Scan conversion or rasterization 1630 may be an operation of forming a 3D image in a 2D array of pixels. For example, scan conversion or rasterization 1630 may be an operation of converting coordinates of the 3D model 610 on a 2D screen (e.g., the display 160) of an electronic device.

Texturing and fragment shading 1635 may be an operation of shading.

A portion played in an HMD device with an image applied as texture on a sphere through the foregoing operations may be determined as an FOV viewed by the HMD device from the center of the sphere, and an image corresponding to the FOV may be played.

Hereinafter, an image playback process is described in detail according to a viewpoint based on a main camera and a different viewpoint changed from a main camera direction, for example, one of a viewpoint based on a main traveling direction in which a photographer moves, a viewpoint based on an event, and a viewpoint based on the viewpoint of an external viewer.

FIGS. 17A, 17B, 17C, and 17D illustrate the image playback process of FIG. 14 in detail, in which at least some of the components of FIG. 14 perform an operation of playing an image operation from a selected viewpoint.

Referring to FIGS. 17A to 17D, these components may be provided as software performing the foregoing functions, and the software may be stored in memory and may be loaded by a processor (for example, the processor 120), such as a CPU or a GPU, to implement the functions.

Figure 17A:
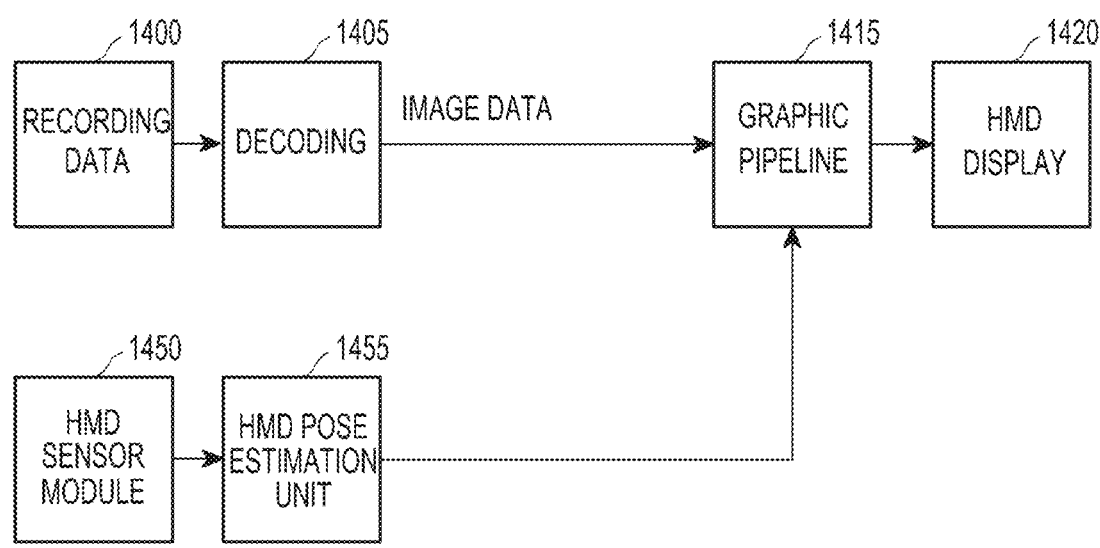
FIGS. 17A, 17B, 17C, and 17D illustrate the image playback process of FIG. 14 in detail according to various embodiments of the present disclosure.

FIG. 17A illustrates components to play an image from a viewpoint based on a main camera among the components of FIG. 14.

Referring to FIG. 17A, recording data 1400 may be separated into image data and sensor data through decoding 1405. Since a method for playing an image from the viewpoint of the main camera does not apply a value for viewpoint change to a taken image and thus does not need to use sensor data, only the image data may be transmitted to the graphic pipeline 1415.

The HMD pose estimation unit 1455 may transmit an HMD pose (e.g., an HMD angle) based on the sensor data, transmitted from the HMD sensor module 1450, to the graphic pipeline 1415. Accordingly, at least part of a 360-degree image, shown by an HMD device at the pose of the moving HMD device, may be rendered and displayed in real time on the HMD display 1420.

For example, defining the pose of the main camera as ($\Phi_1$, $\theta_1$), the HMD device may display a partial image corresponding to an angle (or direction) changed by the pose ($\Phi_2$, $\theta_2$) of the HMD device from the pose ($\Phi_1$, $\theta_1$) of the main camera on the HMD display 1420. Thus, the user may see a view changed in an HMD gaze direction based on the viewpoint of the main camera (or the viewpoint of a photographer) in the 360-degree image through the HMD display 1420.

Figure 17B:
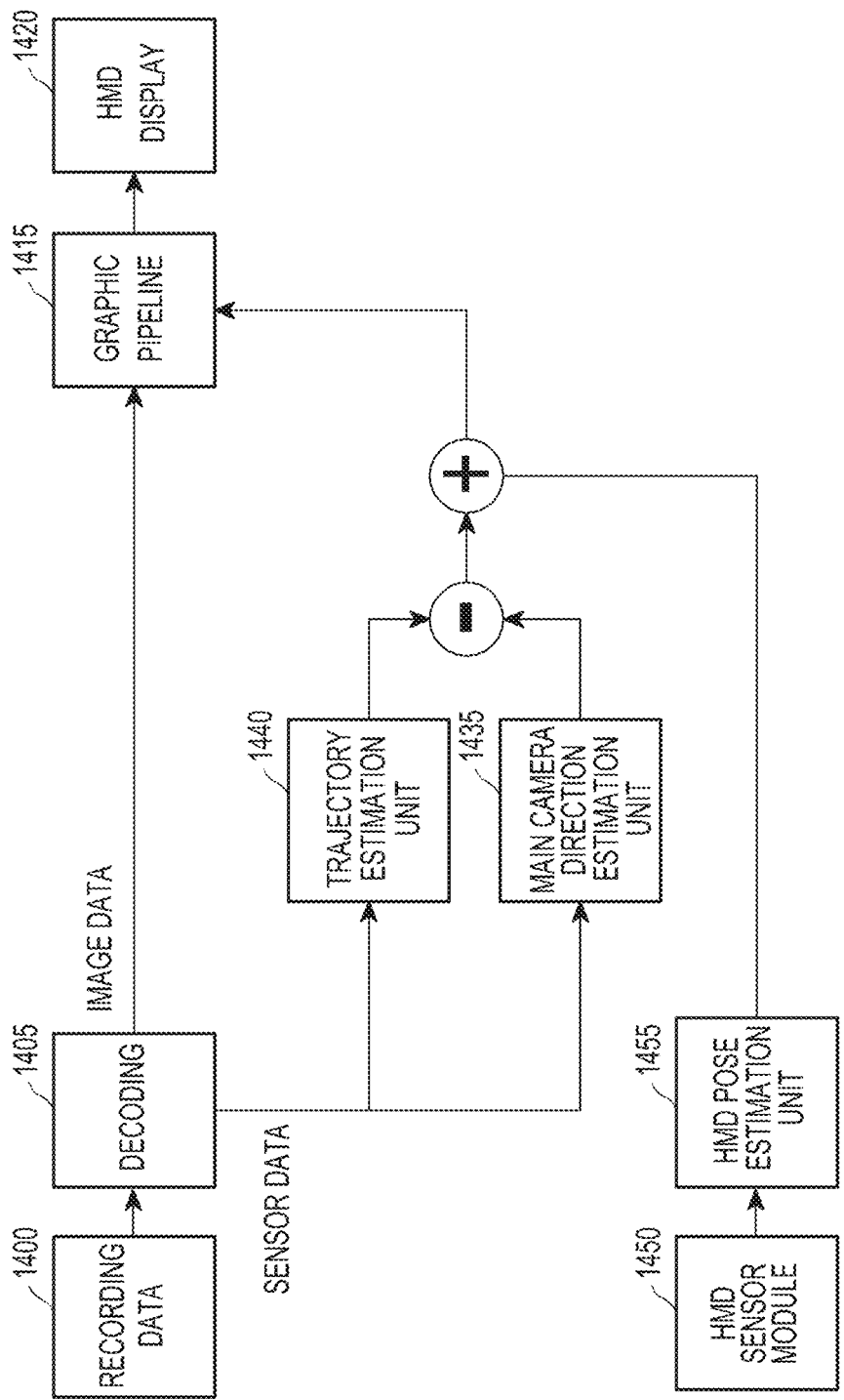

FIG. 17B illustrates components to play an image from a viewpoint based on a main traveling direction in which a photographer moves among the components of FIG. 14.

Referring to FIG. 17B, when recording data 1400 is separated into image data and sensor data through decoding 1405, the sensor data may be transmitted to the trajectory estimation unit 1440 and the main camera direction estimation unit 1435 and the image data may be transmitted to the graphic pipeline 1415. The sensor data may be used to estimate the direction (angle or pose) of a camera and the traveling direction (or moving direction) of a photographer. The trajectory estimation unit 1440 may provide the traveling direction, and the main camera direction estimation unit 1435 may provide the direction of a main camera. Accordingly, a difference between the pose of the main camera and the traveling direction may be obtained. When the angle of a gaze according to an HMD pose is obtained by the HMD device, the difference between the pose of the main camera and the traveling direction is added to the angle of the HMD gaze, thereby obtaining a final angle. The graphic pipeline 1415 may render 360-degree image data into a stereoscopic form in a manner of disposing the camera at the center of a 3D model (e.g., a sphere) and drawing the image data on the sphere. Subsequently, the graphic pipeline 1415 may provide an amount of image data corresponding to the size of an HMD display buffer in the direction of the final angle in the rendered image to the HMD display 1420, and the HMD display 1420 may output the obtained image data.

For example, defining the pose of the main camera as ($\Phi_1$, $\theta_1$), since it is necessary to change a direction from the pose of the main camera as ($\Phi_1$, $\theta_1$) to the traveling direction of the photographer, an angle corresponding to a viewpoint in the traveling direction of the photographer is obtained by subtracting the traveling direction ($\Phi_3$, $\theta_3$) of the photographer from the pose ($\Phi_1$, $\theta_1$) of the main camera. Subsequently, the HMD angle (i.e., the angle ($\Phi_2$, $\theta_2$) in the HMD gaze direction), provided from the HMD pose estimation unit 1455, may be applied in order to see a view changed in the HMD gaze direction from the traveling direction of the photographer. Accordingly, the HMD device may display a partial image corresponding to a final angle (final direction) equal to the pose ($\Phi_1$, $\theta_1$) of the main camera—the traveling direction ($\Phi_3$, $\theta_3$) of the photographer+the HMD angle ($\Phi_2$, $\theta_2$) on the HMD display 1420. Thus, the user may see an image corresponding to a direction obtained by adjusting the angle to the traveling direction based on the gaze direction of the main camera and applying the HMD gaze direction.

Figure 17C:
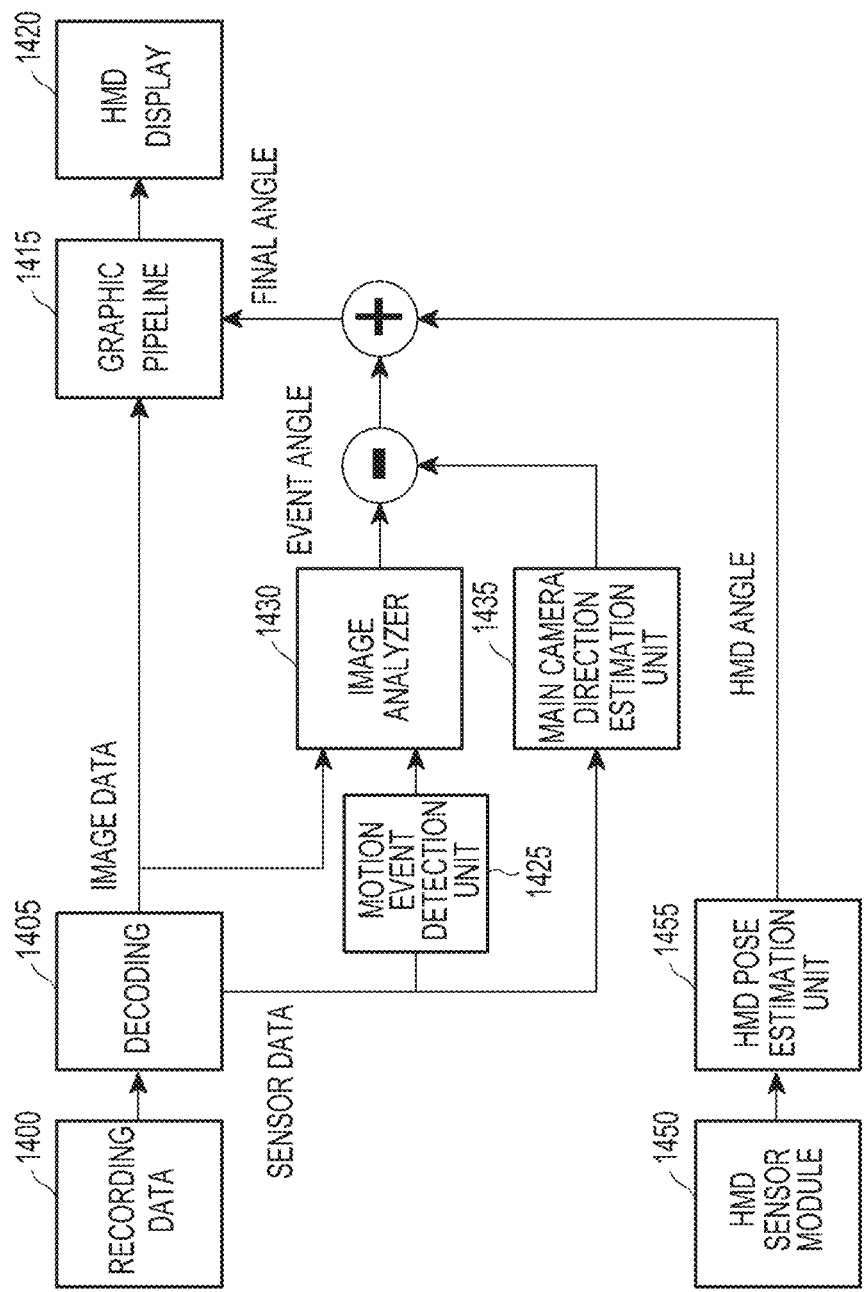

FIG. 17C illustrates components to play an image from a viewpoint based on an event among the components of FIG. 14.

Referring to FIG. 17C, since the operation of the components of FIG. 17C is similar to those in FIG. 17B, a detailed description thereof is omitted. Here, when recording data is separated into image data and sensor data through decoding 1405, the sensor data may be transmitted to the motion event detection unit 1425. When a sensor value that is out of the range of average sensor data values is detected based on sensor data associated with an image frame, the motion event detection unit 1425 may determine that an event has occurred. For example, the motion event detection unit 1425 may classify sensor values using unsupervised learning as a machine-learning method, and may determine that a motion event has occurred when a sensor value is out of a classification range. When a motion event occurs, the motion event detection unit 1425 may identify an image frame in which the motion event occurs based on time, may obtain a value with respect to the direction of the motion event from the image frame, and may calculate the angle of the direction of the event.

The image analyzer 1430 may determine the occurrence of an event through a comparison between adjacent image frames, for example, sequential image frames. The image analyzer 1430 may perform inter-frame and intra-frame analysis of an image, and may determine that an event has occurred when a peculiarity different from that in other pixels or adjacent image frames is detected. Accordingly, the image analyzer 1430 may obtain an event angle based on an image frame in which the event occurs. As described above, when at least one of the motion event detection unit 1425 and the image analyzer 1430 detects the occurrence of an event, an event angle, for example, the direction of a motion event that has occurred and the direction of a peculiarity that has occurred, may be obtained. Accordingly, an image from a viewpoint based on the event may be played by applying an angle based on the pose of the HMD device to an angle in which the event angle is applied to the pose of the main camera.

For example, the pose of the main camera as ($\Phi_1$, $\theta_1$) minus the event angle ($\Phi_4$, $\theta_4$) is an angle corresponding to the viewpoint based on the event. The HMD angle (i.e., the angle ($\Phi_2$, $\theta_2$) in the HMD gaze direction), provided from the HMD pose estimation unit 1455, may be applied in order to see a view changed in the HMD gaze direction from the viewpoint based on the event. Accordingly, the HMD device may display a partial image corresponding to a final angle (final direction) equal to the pose ($\Phi_1$, $\theta_1$) of the main camera—the event angle ($\Phi_4$, $\theta_4$)+the HMD angle ($\Phi_2$, $\theta_2$) on the HMD display 1420. Thus, the user may see an image corresponding to a direction obtained by adjusting the angle to the direction of the occurring event based on the gaze direction of the main camera and applying the HMD gaze direction.

Figure 17D:
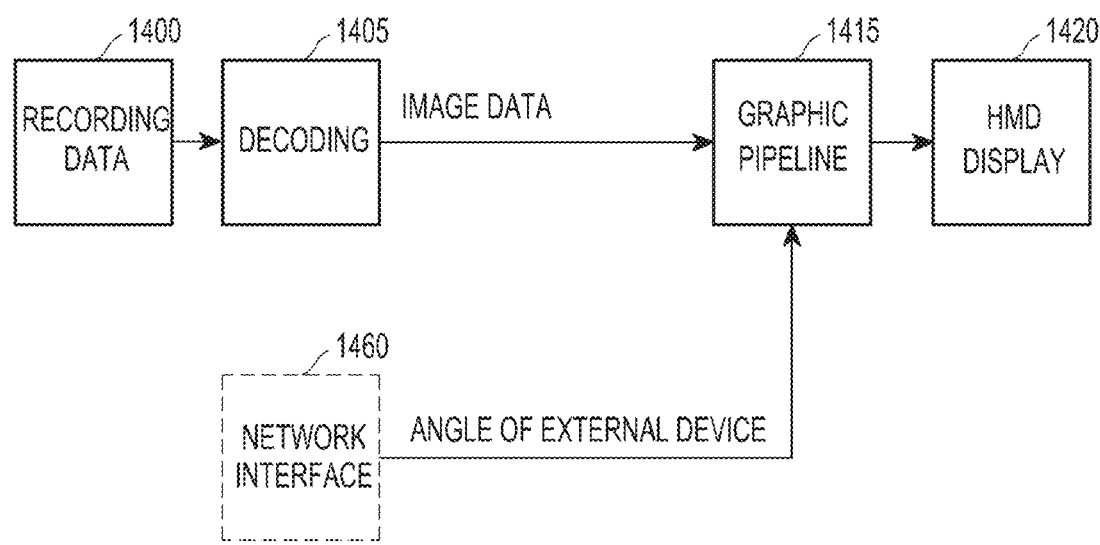

FIG. 17D illustrates components to play an image from a viewpoint based on the viewpoint of an external viewer among the components of FIG. 14.

Referring to FIG. 17D, when an image shared between the user and another viewer is played, the angle of an external device (e.g., another HMD device) may be transmitted to the graphic pipeline 1415 through the network interface 1460. Accordingly, an image corresponding to an angle changed by the angle of the external device based on the viewpoint of the main camera may be played through the HMD display 1420. Thus, a portion played in the HMD device may correspond to an FOV viewed by the external device (e.g., another HMD device) from the center of the sphere, and an image corresponding to the FOV may be played. The FOV of the HMD device may be determined using the angle of the external device. Therefore, the user wearing the HMD device may see an image from the viewpoint of the viewer wearing another HMD device, not from the viewpoint thereof.

Figure 18A:
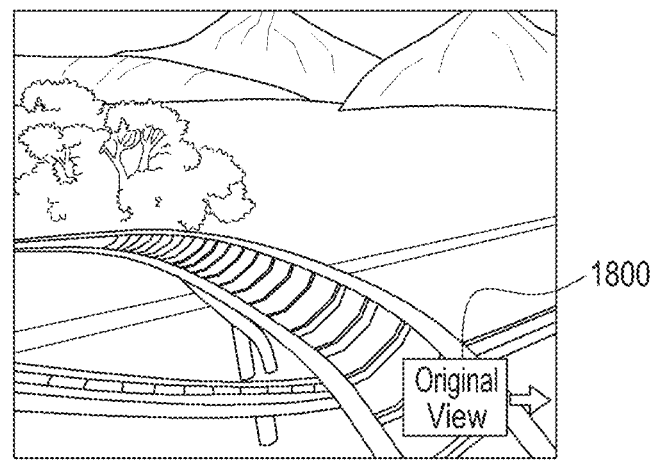
FIG. 18A, 18B, and 18C illustrates a screen for viewpoint selection according to various embodiments of the present disclosure.
Figure 18B:
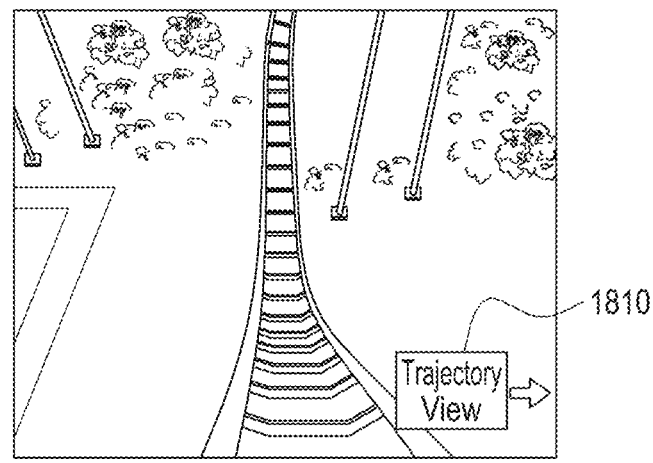
Figure 18C:
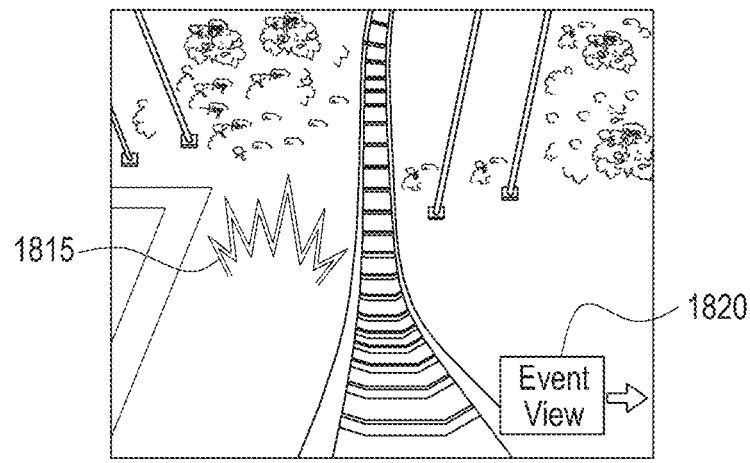

FIG. 18A, 18B, and 18C illustrates a screen for viewpoint selection according to various embodiments of the present disclosure.

Referring to FIG. 18A, when a 360-degree image is played, a viewpoint notification window 1800 may be displayed at the bottom of the screen so that a user may select a viewpoint. For example, an "original view" notification window 1800 functions to indicate the viewpoint of a currently played image. To prevent the screen from being blocked, whether to display the notification window and the method for displaying the notification window may be set through an external input, for example, input using a designated button, according to a user selection.

With the front view of a main camera displayed as illustrated in FIG. 18A, when input for viewpoint change is received from the user, an image corresponding to the new viewpoint direction may be displayed as illustrated in FIG. 18B.

FIG. 18B illustrates the display of a "trajectory view" notification window 1810 indicating that an image is played from a viewpoint corresponding to the traveling direction of a photographer. As illustrated in FIG. 18C, when the occurrence of an event is detected on the screen, for example, when a peculiarity 1815 is detected thereon, by image analysis during image playback, the occurrence of the event may be indicated through an "event view" notification window 1820. Accordingly, the user may select whether to see an image from a viewpoint based on the location where the event occurs. The "event view" notification window 1820 may also function to indicate that an image is played from a viewpoint based on the event. As described above, the user can see a view from a desired viewpoint by changing the viewpoint during image playback, in which the user may change the viewpoint using an input button provided in an HMD device or an external controller. However, a viewpoint change method may not be limited thereto.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter.

The instruction may include a code made by a complier or a code that can be executed by an interpreter. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, a storage medium stores instructions, wherein the instructions are set for at least one processor to perform at least one operation when executed by the at least one processor, and the at least one operation may include displaying a first partial image, which corresponds to a first direction, in an image taken by at least one camera; and displaying a second partial image, which corresponds to a second direction different from the first direction, in the image in response to a first input when the first input is received while the first partial image, which corresponds to the first direction, is displayed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a display;
at least one sensor configured to detect a movement of the electronic device; and
a processor functionally connected to the display and configured to:
display, on the display, a third partial image, which corresponds to a first direction and is based on the movement of the electronic device, in an omnidirectional image when the movement of the electronic device is detected by the at least one sensor while a first partial image corresponding to the first direction in the omnidirectional image is displayed on the display, and
display, on the display, a fourth partial image, which corresponds to a second direction and is based on the movement of the electronic device, in the omnidirectional image when the movement of the electronic device is detected by the at least one sensor while a second partial image corresponding to the second direction in the omnidirectional image is displayed on the display in response to a first input.

2. The electronic device of claim 1,
wherein the first partial image corresponds to a first portion of each frame of the omnidirectional image, and
wherein the second partial image corresponds to a second portion of the frame.
3. The electronic device of claim 1,
wherein the first direction is a reference direction in which a main camera provided in a photographing apparatus taking the omnidirectional image is pointed straight ahead, and
wherein the second direction is a moving direction of the photographing apparatus determined using sensing information associated with the omnidirectional image.
4. The electronic device of claim 3, wherein the sensing information associated with the omnidirectional image comprises at least one of a position of the photographing apparatus, a direction of the photographing apparatus, or movement information on the photographing apparatus.
5. The electronic device of claim 1, further comprising:
a memory configured to store sensing information associated with the omnidirectional image,
wherein the sensing information associated with the omnidirectional image is stored such that the sensing information on capture of each frame of the omnidirectional image is stored per frame.
6. The electronic device of claim 1, further comprising:
a memory configured to store sensing information associated with the omnidirectional image,
wherein the sensing information associated with the omnidirectional image is included in metadata on the omnidirectional image along with identification information on each frame of the omnidirectional image.
7. The electronic device of claim 3, wherein the processor is further configured to:
detect whether an event occurs based on at least one of the sensing information associated with the omnidirectional image or information on a comparison between frames of the taken image when the omnidirectional image is played, and
control the display to display a fifth partial image, which corresponds to a direction of the occurring event, in the omnidirectional image on the display.
8. The electronic device of claim 1, wherein the processor is further configured to perform image stabilization on the first partial image and the second partial image.
9. A method for displaying an image by an electronic device, the method comprising:
displaying a third partial image, which corresponds to a first direction and is based on a movement of the electronic device, in an omnidirectional image when the movement of the electronic device is detected by a sensor while a first partial image corresponding to the first direction in the omnidirectional image is displayed; and
displaying a fourth partial image, which corresponds to a second direction and is based on the movement of the electronic device, in the omnidirectional image when the movement of the electronic device is detected by the sensor while a second partial image corresponding to the second direction in the omnidirectional image is displayed in response to a first input.
10. The method of claim 9,
wherein the first partial image corresponds to a first portion of each frame of the omnidirectional image, and
wherein the second partial image corresponds to a second portion of the frame.

11. The method of claim 9,
wherein the first direction is a reference direction in which a main camera provided in a photographing apparatus taking the omnidirectional image is pointed straight ahead, and
wherein the second direction is a moving direction of the photographing apparatus, determined using sensing information associated with the omnidirectional image.

12. The method of claim 11, wherein the sensing information associated with the omnidirectional image comprises at least one of a position of the photographing apparatus, a direction of the photographing apparatus, or movement information on the photographing apparatus.

13. The method of claim 11, wherein the sensing information associated with the omnidirectional image is stored by:
a method in which sensing information on capture of each frame of the omnidirectional image is associated with each frame, or
a method in which the sensing information is comprised in metadata on the omnidirectional image along with identification information on each frame.

14. The method of claim 11, further comprising:
detecting whether an event occurs based on at least one of the sensing information associated with the omnidirectional image or information on a comparison between frames of the taken image when the omnidirectional image is played; and
displaying a fifth partial image, which corresponds to a direction of the occurring event, in the omnidirectional image on the display.

15. The method of claim 9, further comprising performing image stabilization on the first partial image and the second partial image.

16. A non-transitory computer readable storage medium that stores instructions, which when executed by at least one processor, cause the at least one processor to execute at least one operation comprising:
displaying a third partial image, which corresponds to a first direction and is based on a movement of an electronic device, in an omnidirectional image when the movement of the electronic device is detected by a sensor while a first partial image corresponding to the first direction in the omnidirectional image is displayed; and
displaying a fourth partial image, which corresponds to a second direction and is based on the movement of the electronic device, in the omnidirectional image when the movement of the electronic device is detected by the sensor while a second partial image corresponding to the second direction in the omnidirectional image is displayed in response to a first input.

* * * * *